(12) United States Patent
Ogata et al.

(10) Patent No.: US 8,432,783 B2
(45) Date of Patent: Apr. 30, 2013

(54) OPTICAL PICKUP DEVICE AND POSITION ADJUSTING METHOD FOR LIGHT SEPARATING ELEMENT

(75) Inventors: Masahito Ogata, Gunma (JP); Masayuki Yoshie, Gunma (JP)

(73) Assignees: Sanyo Electric Co., Ltd., Moriguchi-shi, Osaka (JP); Sanyo Optec Design Co., Ltd., Gunma (JP)

( * ) Notice: Subject to any disclaimer, the term of this patent is extended or adjusted under 35 U.S.C. 154(b) by 0 days.

(21) Appl. No.: 13/537,593

(22) Filed: Jun. 29, 2012

(65) Prior Publication Data
US 2013/0003519 A1 Jan. 3, 2013

(30) Foreign Application Priority Data

Jun. 29, 2011 (JP) ................... 2011-144943

(51) Int. Cl.
*G11B 7/00* (2006.01)
(52) U.S. Cl.
USPC ............. 369/112.23; 369/112.03; 369/44.23; 369/44.32
(58) Field of Classification Search ............ 369/112.23, 369/112.03
See application file for complete search history.

(56) References Cited

U.S. PATENT DOCUMENTS

2002/0048233 A1*  4/2002  Ogasawara et al. ........ 369/44.23
2009/0201787 A1*  8/2009  Ogasawara et al. ...... 369/112.23
2009/0225645 A1*  9/2009  Nagatomi ................ 369/112.23
2009/0278029 A1* 11/2009  Ogasawara et al. ......... 250/201.5
2010/0027386 A1*  2/2010  Nagatomi et al. ......... 369/44.32
2010/0027404 A1*  2/2010  Nagatomi et al. ........ 369/112.23
2010/0027405 A1*  2/2010  Nagatomi et al. ........ 369/112.23
2010/0080106 A1*  4/2010  Nagatomi et al. ........ 369/112.26
2010/0177619 A1*  7/2010  Sato et al. ................. 369/112.23
2010/0182891 A1*  7/2010  Mamiya et al. .......... 369/112.23

FOREIGN PATENT DOCUMENTS

JP    2009-211770 A    9/2009
JP    2010-102813 A    5/2010

* cited by examiner

*Primary Examiner* — Van Chow
(74) *Attorney, Agent, or Firm* — Ditthavong Mori & Steiner, P.C.

(57) ABSTRACT

An astigmatism element converges laser light in a first direction for generating a first focal line, and converges the laser light in a second direction perpendicular to the first direction for generating a second focal line. A light separating element guides the laser light entered into two first areas and into two second areas to four respective positions different from each other, and guides the laser light entered into a third area to a position different from the four positions. When an intersection of two straight lines extending in parallel to the first direction and the second direction and intersecting with each other is aligned with an optical axis of the laser light, the third area is disposed at the intersection of the two straight lines.

8 Claims, 25 Drawing Sheets

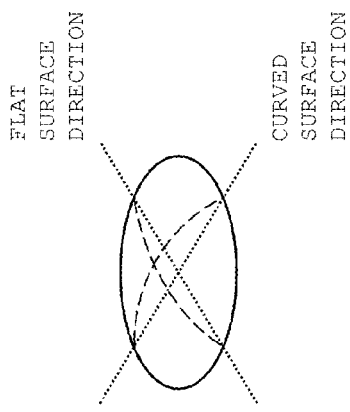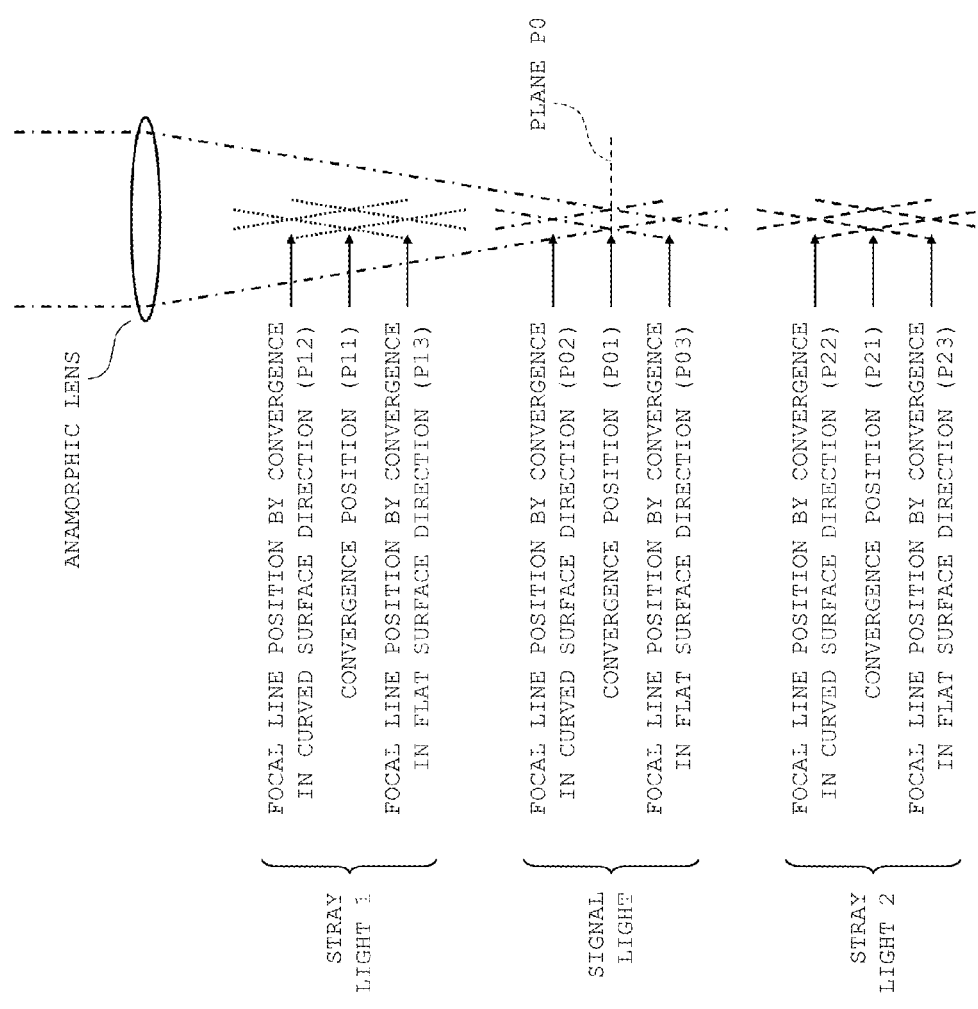

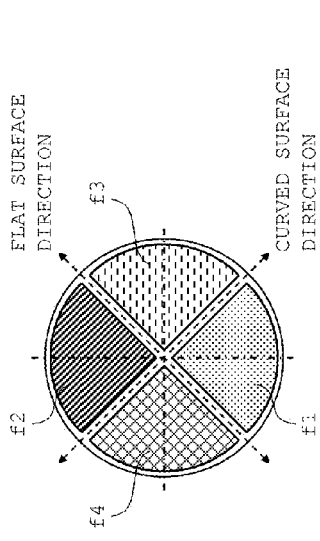
*FIG.2A* LIGHT FLUX DIVIDING PATTERN
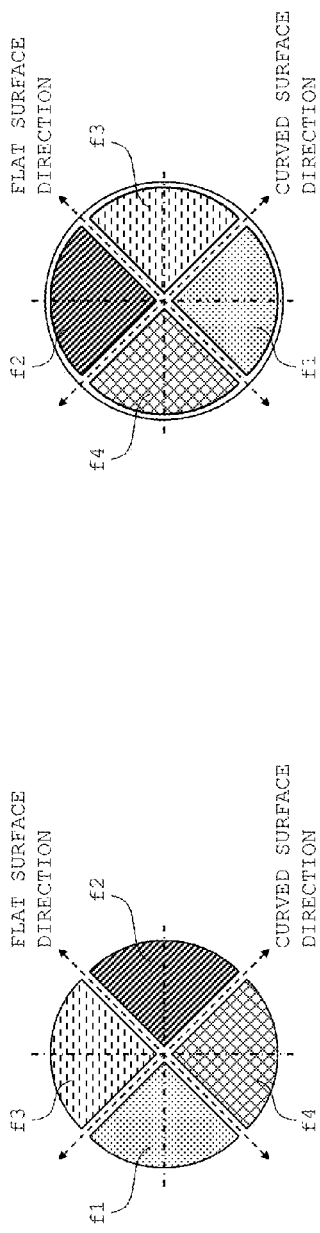
*FIG.2B* SIGNAL LIGHT
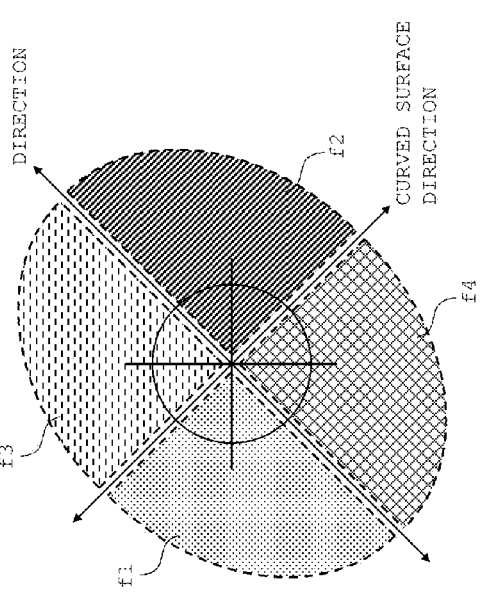
*FIG.2D* STRAY LIGHT 2
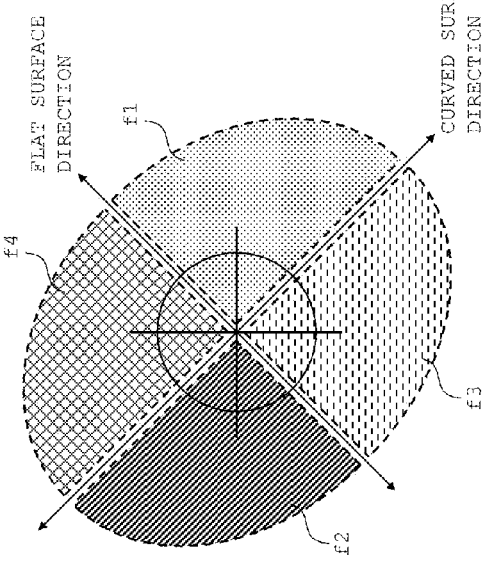
*FIG.2C* STRAY LIGHT 1

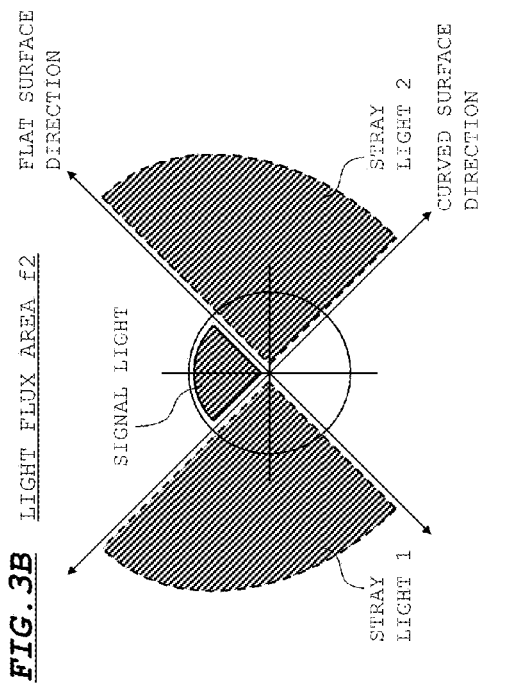
FIG. 3A LIGHT FLUX AREA f1
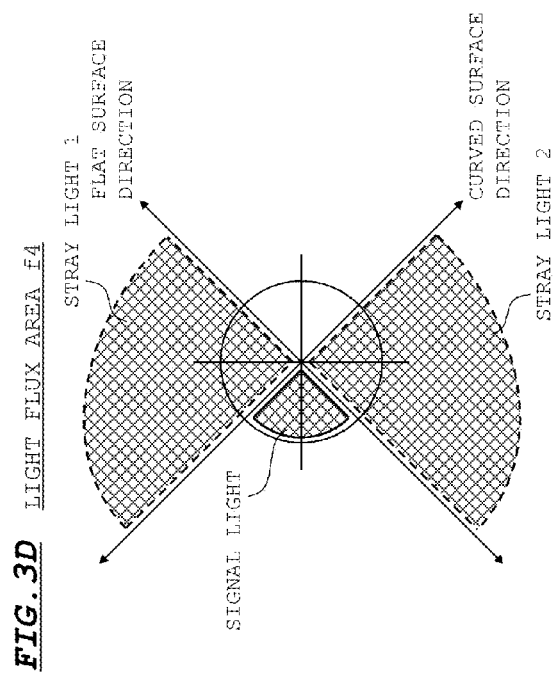
FIG. 3B LIGHT FLUX AREA f2
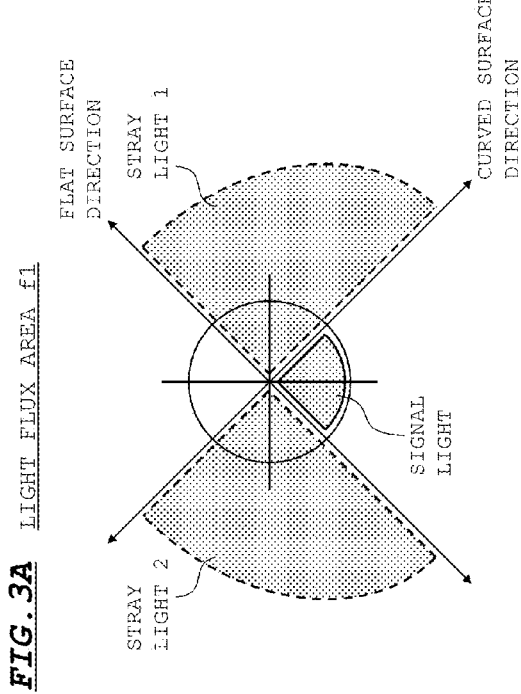
FIG. 3C LIGHT FLUX AREA f3
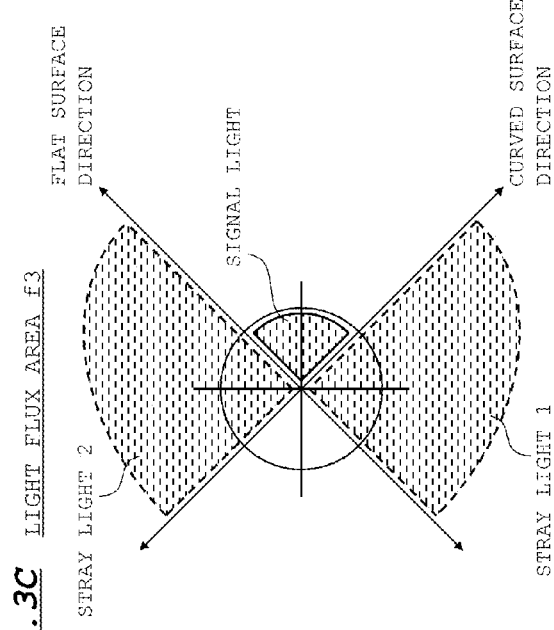
FIG. 3D LIGHT FLUX AREA f4

FIG. 4B  IRRADIATION AREAS ON PLANE P0

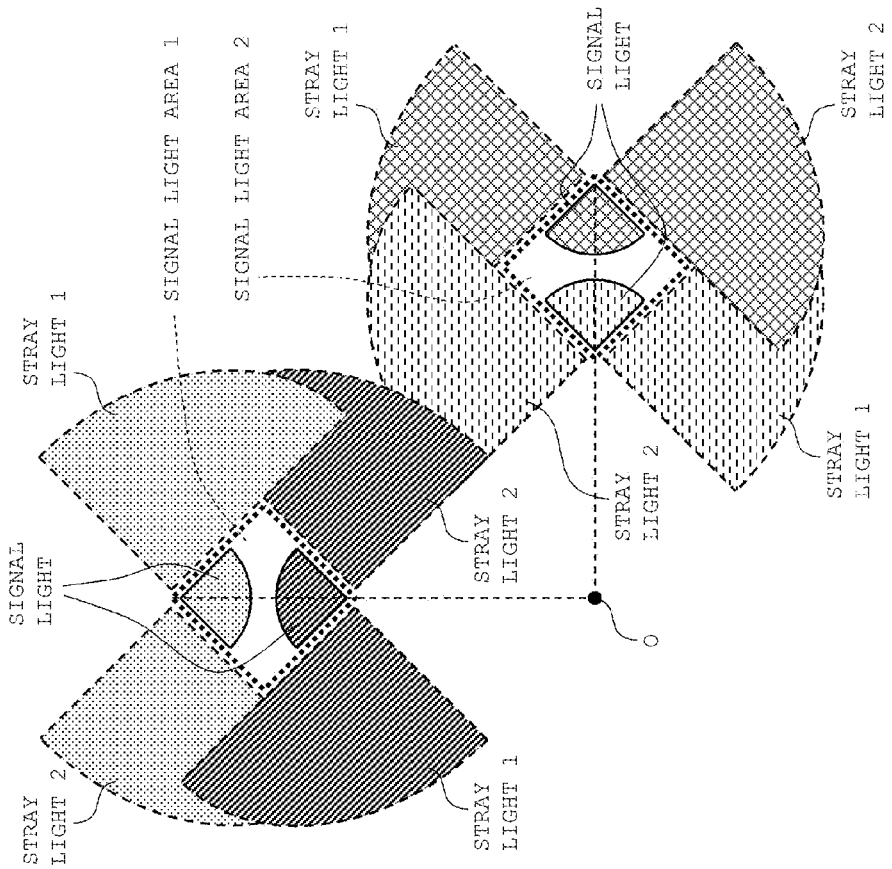
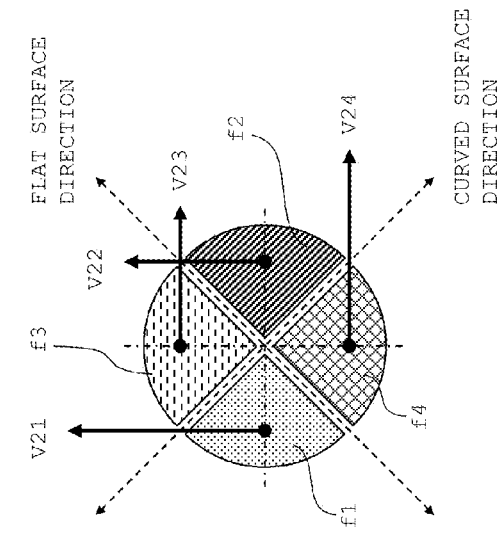

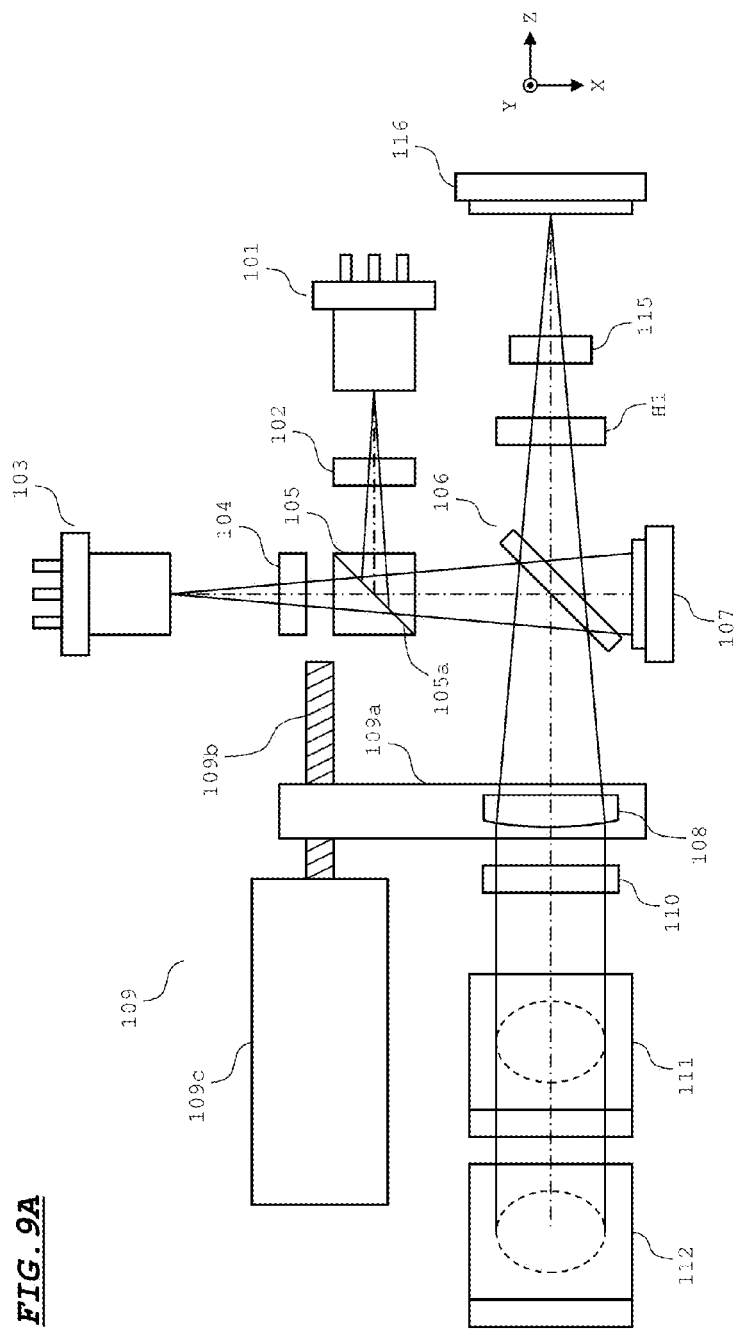
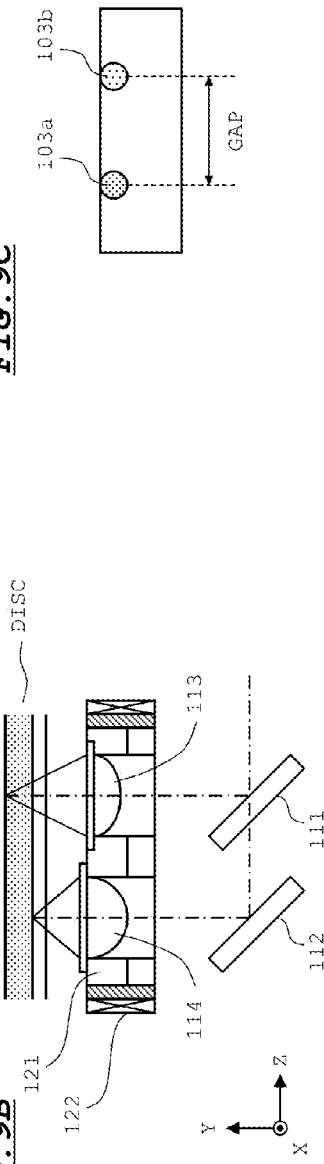
FIG. 9A
FIG. 9B
FIG. 9C

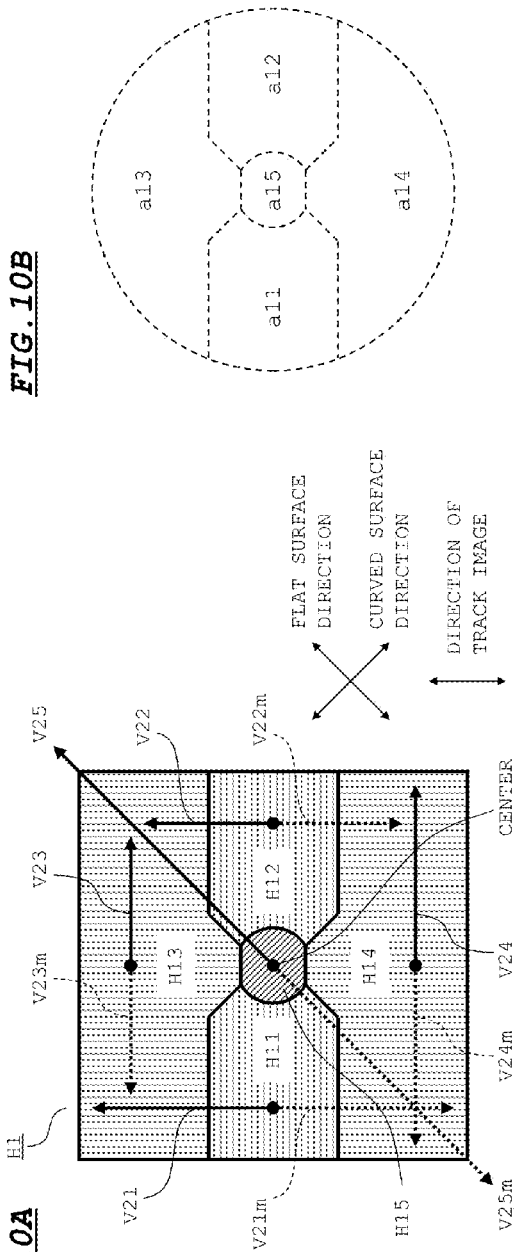
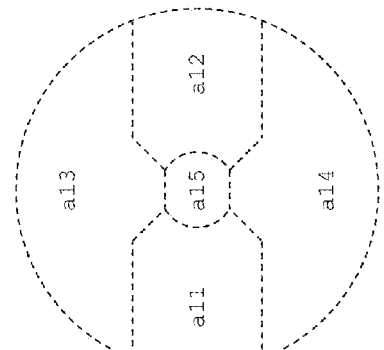
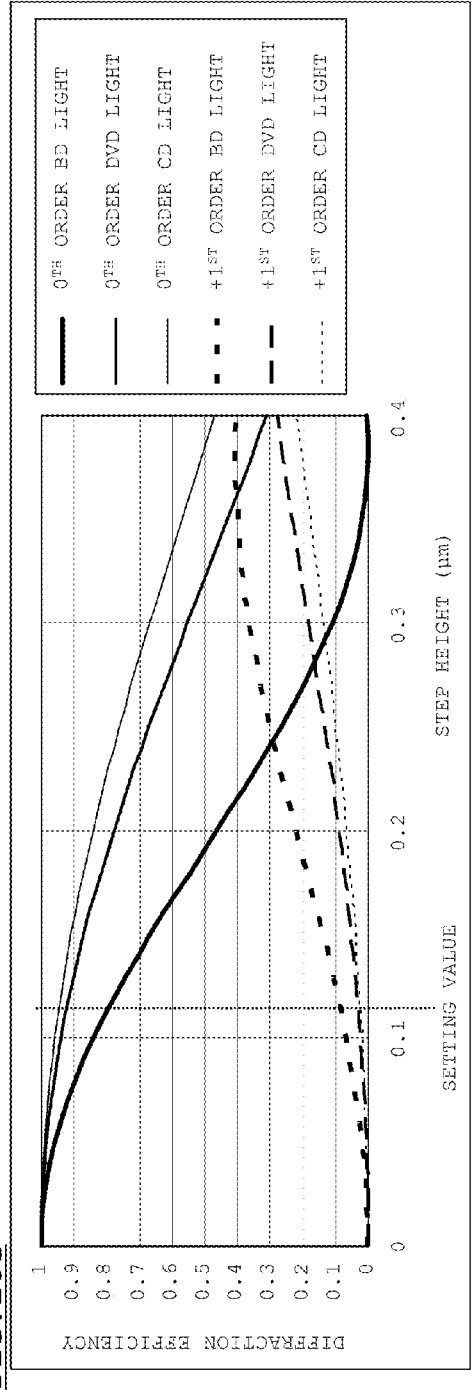
FIG.10A
FIG.10B
FIG.10C

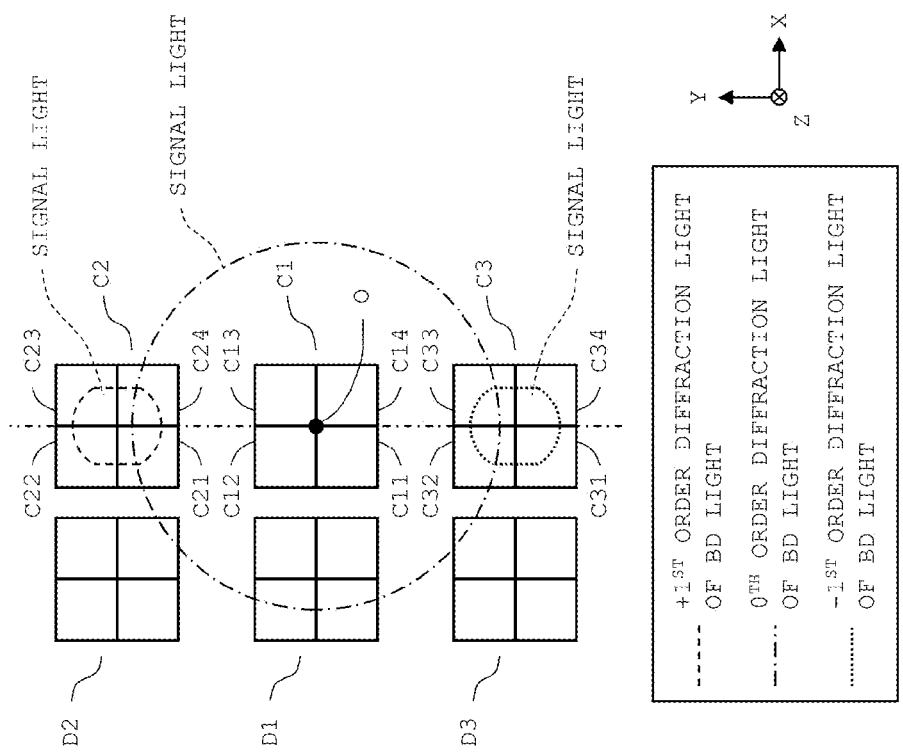
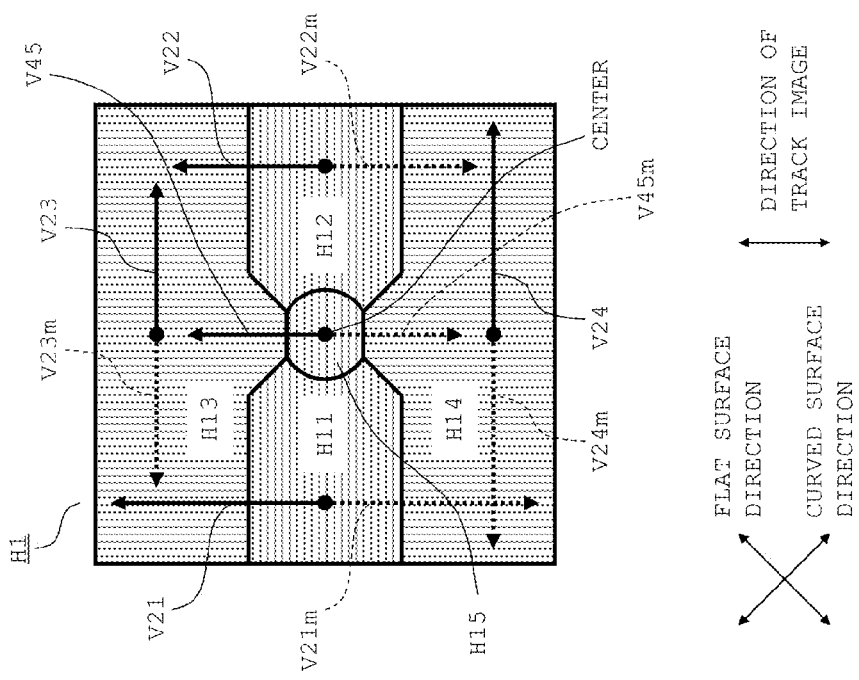
FIG.21A
FIG.21B

OPTICAL PICKUP DEVICE AND POSITION ADJUSTING METHOD FOR LIGHT SEPARATING ELEMENT

This application claims priority under 35 U.S.C. Section 119 of Japanese Patent Application No. 2011-144943 filed Jun. 29, 2011, entitled "OPTICAL PICKUP DEVICE AND POSITION ADJUSTING METHOD FOR LIGHT SEPARATING ELEMENT". The disclosure of the above application is incorporated herein by reference.

BACKGROUND OF THE INVENTION

1. Field of the Invention

The present invention relates to an optical pickup device and a position adjusting method for a light separating element in an optical pickup device, and more particularly to an arrangement for use in irradiating laser light onto a recording medium having plural laminated recording layers.

2. Disclosure of Related Art

In recent years, the number of recording layers has been increasing, as the data capacity of an optical disc increases. The data capacity of a disc can be remarkably enhanced by forming plural recording layers in the one disc. In the case where recording layers are laminated, generally, two layers have been formed on one side of a disc. In recent years, however, a disc having three or more recording layers on one side thereof has been put into practical use in order to further increase the data capacity. An increase in the number of laminated recording layers enables to increase the data capacity of a disc. An increase in the number of laminated recording layers, however, may narrow the interval between the recording layers, and increase signal degradation resulting from an interlayer crosstalk.

Laminating recording layers weakens reflected light from a recording layer (a target recording layer) to be recorded/reproduced. Accordingly, incidence of unwanted reflected light (stray light) from a recording layer at an upper position or a lower position of the target recording layer into a photodetector may degrade a detection signal, and adversely affect focus servo control and tracking servo control. In view of this, in the case where a large number of recording layers are laminated, it is necessary to properly remove stray light, and stabilize a signal from a photodetector.

Japanese Unexamined Patent Publication No. 2009-211770 (corresponding to U.S. Patent Application Publication No. US2009/0225645A1) discloses a novel arrangement of an optical pickup device capable of properly removing stray light, in the case where a large number of recording layers are formed. With this arrangement, it is possible to form a rectangular area (signal light area) where only signal light exists, on a light receiving surface of a photodetector. Reflected light from a recording medium is irradiated at positions near vertex angles of the signal light area. By disposing sensors of a photodetector at the positions near the vertex angles of the signal light area, it is possible to suppress an influence on detection signals resulting from stray light.

In the optical pickup device thus constructed, since stray light is irradiated onto a position near the signal light area, stray light irradiated to the outside of the signal light area may be entered into a sensor.

Further, in the optical pickup device thus constructed, a light separating element is disposed for separating reflected light from a recording medium into signal light. In this arrangement, it is necessary to dispose the light separating element at an appropriate position for properly guiding the each signal light to the corresponding sensor.

SUMMARY OF THE INVENTION

A first aspect of the invention relates to an optical pickup device. The optical pickup device according to the first aspect includes a laser light source; an objective lens which focuses laser light emitted from the laser light source on a recording medium; an astigmatism element into which the laser light reflected on the recording medium is entered, and which converges the laser light in a first direction for generating a first focal line and converges the laser light in a second direction perpendicular to the first direction for generating a second focal line; a photodetector which receives the laser light passing through the astigmatism element; and a light separating element into which the laser light reflected on the recording medium is entered, and which guides the laser light entered into two first areas and into two second areas at four respective positions different from each other, on a light receiving surface of the photodetector, and which guides the laser light entered into a third area to a position different from the four positions, on the light receiving surface of the photodetector. In this arrangement, the photodetector has a plurality of sensing portions disposed at the four positions to which the laser light entered into the two first areas and into the two second areas is guided, and has a four-divided sensor disposed at the position to which the laser light entered into the third area is guided. Further, when an intersection of two straight lines extending in parallel to the first direction and the second direction and intersecting with each other is aligned with an optical axis of the laser light, the two first areas are disposed in a direction along which one pair of vertically opposite angles defined by the two straight lines are aligned, and the two second areas are disposed in a direction along which another pair of vertically opposite angles are aligned, and the third area is disposed at the intersection of the two straight lines. Further, the four-divided sensor is disposed at such a position that one of two parting lines of the four-divided sensor is oriented in a direction toward a reference point at which the optical axis of the laser light reflected on the recording medium intersects the light receiving surface of the photodetector.

A second aspect of the invention relates to an optical pickup device. The optical pickup device according to the second aspect includes a laser light source; an objective lens which focuses laser light emitted from the laser light source on a recording medium; an astigmatism element into which the laser light reflected on the recording medium is entered, and which converges the laser light in a first direction for generating a first focal line and converges the laser light in a second direction perpendicular to the first direction for generating a second focal line; a photodetector which receives the laser light passing through the astigmatism element; and a light separating element into which the laser light reflected on the recording medium is entered, and which guides the laser light entered into two first areas and into two second areas at four respective positions different from each other, on a light receiving surface of the photodetector, and which guides the laser light entered into a third area to two positions different from the four positions, on the light receiving surface of the photodetector. In this arrangement, the photodetector has a plurality of sensing portions disposed at the four positions to which the laser light entered into the two first areas and into the two second areas is guided, and has a first four-divided sensor and a second four-divided sensor disposed at the two respective positions to which the laser light entered into the third area is guided. Further, when an intersection of two straight lines extending in parallel to the first direction and the second direction and intersecting with each other is aligned with an optical axis of the laser light, the two first areas are disposed in a direction along which one pair of vertically opposite angles defined by the two straight lines are aligned, and the two second areas are disposed in a direction along which another pair of vertically opposite angles are aligned, and the third area is disposed at the intersection of the two straight lines. Further, the first four-divided sensor and the second four-divided sensor are disposed at such positions that one of two parting lines of the first four-divided sensor, and one of two parting lines of the second four-divided sensor are oriented in a direction toward a reference point at which the optical axis of the laser light reflected on the recording medium intersects the light receiving surface of the photodetector.

A third aspect of the invention relates to a position adjusting method for the light separating element in the optical pickup device according to the first aspect. In the position adjusting method for the light separating element in the optical pickup device according to the third aspect, the four-divided sensor is composed of four sensing portions $Bz1$, $Bz2$, $Bz3$ and $Bz4$. The four sensing portion $Bz1$, $Bz2$, $Bz3$ and $Bz4$ are divided into a group constituted of the sensing portions $Bz1$ and $Bz2$, and a group constituted of the sensing portions $Bz3$ and $Bz4$ by the one of the two parting lines of the four-divided sensor oriented in the direction toward the reference point, and the sensing portions $Bz1$, $Bz2$, $Bz3$ and $Bz4$ are divided into a group constituted of the sensing portions $Bz1$ and $Bz4$, and a group constituted of the sensing portions $Bz2$ and $Bz3$ by the other one of the two parting lines of the four-divided sensor. In the above condition, the position adjusting method for the light separating element in the optical pickup device according to the third aspect includes a step of adjusting a position of the light separating element in an optical axis direction of the laser light in such a manner that HOEz defined in the following equation is approximated to zero, and a step of adjusting a position of the light separating element in a rotating direction with respect to the reference point as a center in such a manner that HOEθ defined in the following equation is approximated to zero.

$$HOEz = \{(Bz1+Bz4)-(Bz2+Bz3)\}/(Bz1+Bz2+Bz3+Bz4)$$

$$HOE\theta = \{(Bz1+Bz2)-(Bz3+Bz4)\}/(Bz1+Bz2+Bz3+Bz4)$$

where $Bz1$, $Bz2$, $Bz3$ and $Bz4$ are respectively detection signals to be outputted from the sensing portions $Bz1$, $Bz2$, $Bz3$ and $Bz4$ when laser light is emitted from the laser light source in a state that the recording medium is loaded in the optical pickup device.

A fourth aspect of the invention relates to a position adjusting method for the light separating element in the optical pickup device according to the second aspect. In the position adjusting method for the light separating element in the optical pickup device according to the fourth aspect, the first four-divided sensor is composed of four sensing portions $C21$, $C22$, $C23$ and $C24$; and the second four-divided sensor is composed of four sensing portions $C31$, $C32$, $C33$ and $C34$. The four sensing portion $C21$, $C22$, $C23$ and $C24$ are divided into a group constituted of the sensing portions $C21$ and $C22$, and a group constituted of the sensing portions $C23$ and $C24$ by the one of the two parting lines of the first four-divided sensor oriented in the direction toward the reference point; the four sensing portions $C21$, $C22$, $C23$ and $C24$ are divided into a group constituted of the sensing portions $C21$ and $C24$, and a group constituted of the sensing portions $C22$ and $C23$ by the other one of the two parting lines of the first four-divided sensor; the four sensing portion $C31$, $C32$, $C33$ and $C34$ are divided into a group constituted of the sensing portions $C31$ and $C32$, and a group constituted of the sensing portions $C33$ and $C34$ by the one of the two parting lines of the second four-divided sensor oriented in the direction toward the reference point; and the four sensing portions $C31$, $C32$, $C33$ and $C34$ are divided into a group constituted of the sensing portions $C31$ and $C34$, and a group constituted of the sensing portions $C32$ and $C33$ by the other one of the two parting lines of the second four-divided sensor. In the above condition, the position adjusting method for the light separating element in the optical pickup device according to the fourth aspect includes a step of adjusting a position of the light separating element in an optical axis direction of the laser light in such a manner that HOEz defined in the following equation is approximated to zero, and a step of adjusting a position of the light separating element in a rotating direction with respect to the reference point as a center in such a manner that HOEθ defined in the following equation is approximated to zero.

$$HOEz = \{\{(C21+C24)-(C22+C23)\}+\{(C32+C33)-(C31+C34)\}\}/\{(C21+C22+C23+C24)+(C31+C32+C33+C34)\}$$

$$HOE\theta = \{\{(C21+C22)-(C23+C24)\}+\{(C33+C34)-(C31+C32)\}\}/\{(C21+C22+C23+C24)+(C31+C32+C33+C34)\}$$

where $C21$, $C22$, $C23$ and $C24$ are respectively detection signals to be outputted from the sensing portions $C21$, $C22$, $C23$ and $C24$ when laser light is emitted from the laser light source in a state that the recording medium is loaded in the optical pickup device, and $C31$, $C32$, $C33$ and $C34$ are respectively detection signals to be outputted from the sensing portions $C31$, $C32$, $C33$ and $C34$ when laser light is emitted from the laser light source in a state that the recording medium is loaded in the optical pickup device.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams for describing a technical principle (as to how laser light converges) in an embodiment of the invention.

FIGS. 2A through 2D are diagrams for describing the technical principle (as to how light flux areas are distributed) in the embodiment.

FIGS. 3A through 3D are diagrams for describing the technical principle (as to how signal light and stray light are distributed) in the embodiment.

FIGS. 4A and 4B are diagrams for describing the technical principle (a method for extracting only signal light) in the embodiment.

FIGS. 6A and 6B are diagrams for describing the technical principle (the method for extracting only signal light) in the embodiment.

FIGS. 9A through 9C are diagrams showing an optical system of an optical pickup device in an example of the invention.

FIGS. 10A through 10C are diagrams showing an arrangement of a light separating element in the example.

FIG. 21A is a plan view showing a light separating element and FIG. 21B is a diagram showing a portion near a center of a photodetector as a modification of the example.

Figure 4A:
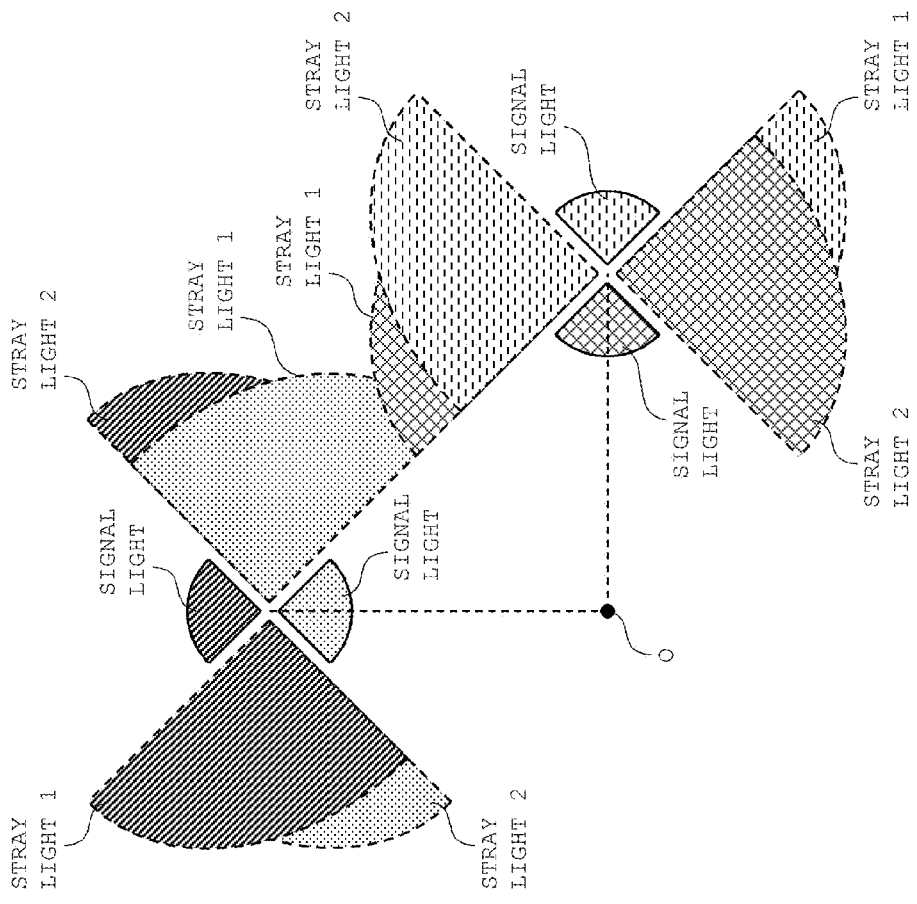

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

Firstly, a technical principle to which the embodiment of the invention is applied is described referring to FIGS. 1A through 8C.

FIGS. 1A, 1B are diagrams for describing as to how laser light is converged. FIG. 1A is a diagram showing a state as to how laser light (signal light) reflected on a target recording layer, laser light (stray light 1) reflected on a layer located at a rearward position with respect to the target recording layer, and laser light (stray light 2) reflected on a layer located at a forward position with respect to the target recording layer are converged. FIG. 1B is a diagram showing an arrangement of an anamorphic lens to be used in the technical principle.

Referring to FIG. 1B, the anamorphic lens has a function of converging laser light to be entered in a direction in parallel to the optical axis of the anamorphic lens in a curved surface direction and in a flat surface direction. In this embodiment, the curved surface direction and the flat surface direction intersect perpendicularly to each other. Further, the curved surface direction has a smaller radius of curvature than that of the flat surface direction, and has a greater effect of converging laser light to be entered into the anamorphic lens.

In the present specification, to simplify the description on the astigmatism function of the anamorphic lens, the terms "curved surface direction" and "flat surface direction" are used. Actually, however, as far as the anamorphic lens has a function of forming focal lines on the optical axis of the anamorphic lens at different positions from each other, the shape of the anamorphic lens in the "flat surface direction" in FIG. 1B is not limited to a flat plane shape. In the case where laser light is entered into the anamorphic lens in a convergence state, the shape of the anamorphic lens in the "flat surface direction" may be a straight line shape (where the radius of curvature=∞).

Referring to FIG. 1A, signal light converged by the anamorphic lens forms focal lines at different positions from each other by convergence in the curved surface direction and in the flat surface direction. The focal line position (P02) of signal light by convergence in the curved surface direction is closer to the anamorphic lens than the focal line position (P03) of signal light by convergence in the flat surface direction, and the convergence position (P01) of signal light is an intermediate position between the focal line positions (P02) and (P03) of signal light by convergence in the curved surface direction and in the flat surface direction. The beam spot of signal light has a shape of a least circle of confusion at the convergence position (P01). A plane perpendicular to the optical axis of laser light to be entered into the anamorphic lens, at the convergence position (P01), is hereinafter called as a "plane P0".

Likewise, the focal line position (P12) of stray light 1 converged by the anamorphic lens in the curved surface direction is closer to the anamorphic lens than the focal line position (P13) of stray light 1 by convergence in the flat surface direction. The anamorphic lens is designed to set the focal line position (P13) of stray light 1 by convergence in the flat surface direction closer to the anamorphic lens than the convergence position (P01) of signal light.

Likewise, the focal line position (P22) of stray light 2 converged by the anamorphic lens in the curved surface direction is closer to the anamorphic lens than the focal line position (P23) of stray light 2 by convergence in the flat surface direction. The anamorphic lens is designed to set the focal line position (P22) of stray light 2 by convergence in the curved surface direction away from the anamorphic lens than the convergence position (P01) of signal light.

The following is a description on the relations between light flux areas of signal light and stray light 1, 2 on the plane P0, taking into account the above matter.

FIG. 2A is a diagram showing four light flux areas f1 through f4 defined for laser light to be entered into the anamorphic lens. In this arrangement, signal light passing through the light flux areas f1 through f4 is distributed on the plane P0, as shown in FIG. 2B. Stray light 1 passing through the light flux areas f1 through f4 is distributed on the plane P0, as shown in FIG. 2C. Stray light 2 passing through the light flux areas f1 through f4 is distributed on the plane P0, as shown in FIG. 2D. In FIGS. 2B through 2D, the circle indicating the beam diameter of signal light is indicated by the solid line, and as shown in FIGS. 2C, 2D, stray light 1 and stray light 2 spread with a larger area than the area of signal light.

In the above arrangement, if signal light and stray light 1, 2 on the plane P0 are extracted in each of the light flux areas, the distribution of each light is as shown in FIGS. 3A through 3D. In this arrangement, signal light passing through each light flux area does not overlap stray light 1 and stray light 2 passing through the corresponding light flux area. Accordingly, if the device is configured in such a manner that only signal light is received by sensors, after signal light and stray light 1, 2 passing through the each light flux area are separated in directions different from each other, only signal light is entered into the corresponding sensor, which makes it possible to suppress incidence of stray light. Thus, it is possible to avoid degradation of a detection signal resulting from stray light.

As described above, it is possible to extract only signal light by dispersing the light passing through the light flux areas f1 through f4 from each other on the plane S0. The embodiment is made based on the above technical principle.

FIG. 4A is a diagram showing vectors to be imparted to the propagating directions of laser light passing through the light flux areas f1 through f4 for separating laser light (signal light and stray light 1, 2) passing through the light fluxes areas f1 through f4 on the plane P0. FIG. 4A is a diagram of the anamorphic lens when viewed from the propagating directions of laser light at the time of incidence into the anamorphic lens.

The propagating directions of laser light passing through the light flux areas f1 through f4 are respectively changed by imparting vectors V01 through V04. The directions of the vectors V01 through V04 are inclined by 45 degrees with respect to the flat surface direction and with respect to the curved surface direction. The directions of the vectors V01 and V02 coincide with each other, and the directions of the vectors V03 and V04 coincide with each other. Further, the magnitudes of the vectors V01 and V04 are equal to each other, and the magnitudes of the vectors V02 and V03 are equal to each other. The magnitudes of the vectors V01 through V04 are defined as angles with respect to the propagating directions of laser light before these vectors are imparted (the propagating directions of laser light at the time of incidence into the anamorphic lens).

When the propagating directions are changed as shown in FIG. 4A, laser light (signal light and stray light 1, 2) passing through the light flux areas f1 through f4 are irradiated on the plane P0, as shown in FIG. 4B. FIG. 4B also shows a center O representing the optical axis of laser light before the propagating directions are changed. Adjusting the directions and the magnitudes of the vectors V01 through V04 makes it possible to distribute signal light and stray light 1, 2 passing through each of the light flux areas f1 through f4, on the plane P0, as shown in FIG. 4B. With this arrangement, it is possible to define an area where only the irradiation area of signal light exists on the plane P0.

Figure 5A:
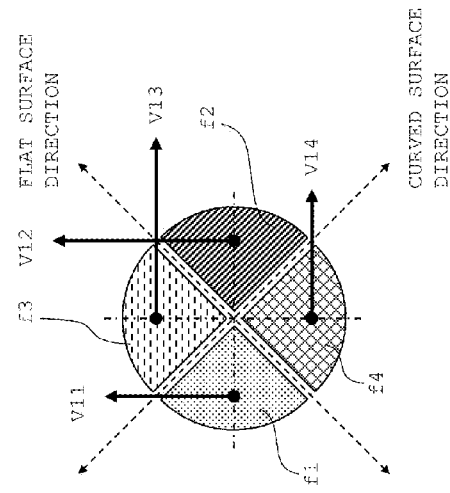
FIGS. 5A and 5B are diagrams for describing the technical principle (the method for extracting only signal light) in the embodiment.

Alternatively, as shown in FIG. 5A, the propagating directions of laser light passing through the light flux areas f1 through f4 may be respectively changed by imparting vectors V11 through V14, in place of the arrangement shown in FIG. 4A. In the modification, the directions of the vectors V11 through V14 coincide with the directions of the vectors V01 through V04 shown in FIG. 4A. Further, the magnitude of the vector V12 is larger than the magnitude of the vector V11, and the magnitude of the vector V13 is larger than the magnitude of the vector V14.

Figure 5B:
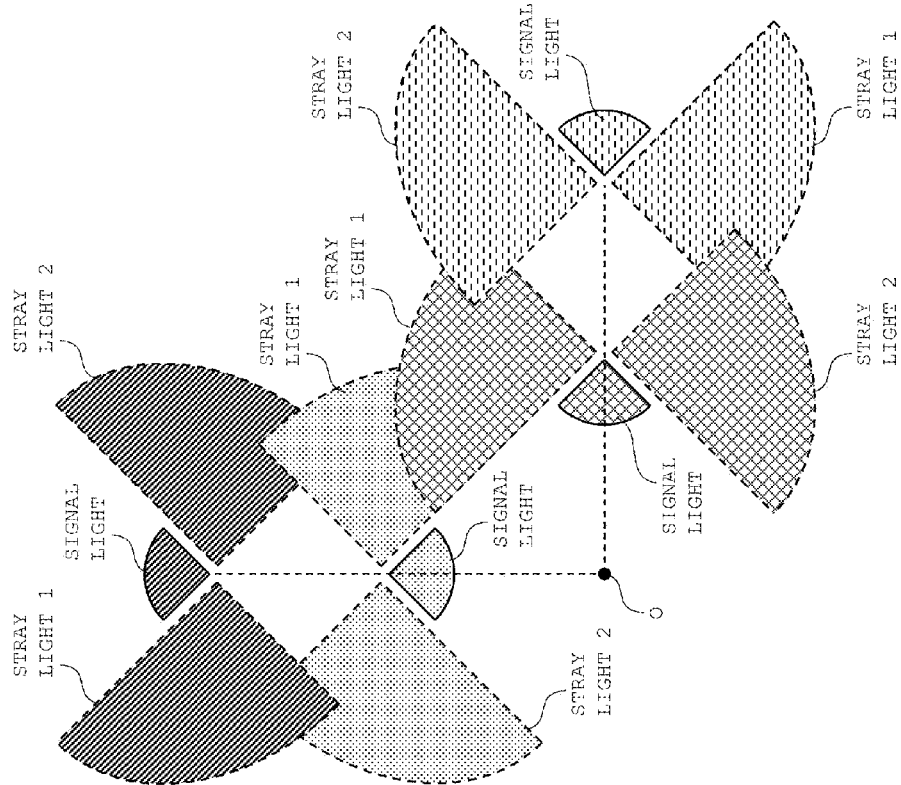

If the propagating directions are changed as shown in FIG. 5A, laser light (signal light and stray light 1, 2) passing through the light flux areas f1 through f4 are irradiated on the plane P0, as shown in FIG. 5B. In this modification, it is also possible to define an area where only the irradiation area of signal light exists on the plane P0.

Further alternatively, as shown in FIG. 6A, the propagating directions of laser light passing through the light flux areas f1 through f4 may be respectively changed by imparting vectors V21 through V24, in place of the arrangement shown in FIG. 4A. In this modification, the directions of the vectors V21 through V24 coincide with the directions of the vectors V01 through V04 shown in FIG. 4A. Further, the magnitude of the vector V21 is larger than the magnitude of the vector V22, and the magnitude of the vector V24 is larger than the magnitude of the vector V23.

If the propagating directions are changed as shown in FIG. 6A, laser light (signal light and stray light 1, 2) passing through the light flux areas f1 through f4 are irradiated on the plane P0, as shown in FIG. 6B. In this modification, it is also possible to define an area where only the irradiation area of signal light exists on the plane P0. Specifically, in this modification, the irradiation areas of laser light (signal light) passing through the light flux areas f1, f2 are located at vertex angular positions corresponding to diagonal positions of a rectangle (signal light area 1) where only these two irradiation areas exist, and the irradiation areas of laser light (signal light) passing through the light flux areas f3, f4 are located at vertex angular positions corresponding to diagonal positions of a rectangle (signal light area 2) where only these two irradiation areas exist.

In the following, a sensor and a signal generating method based on a conventional astigmatism method are described.

Figure 7B:
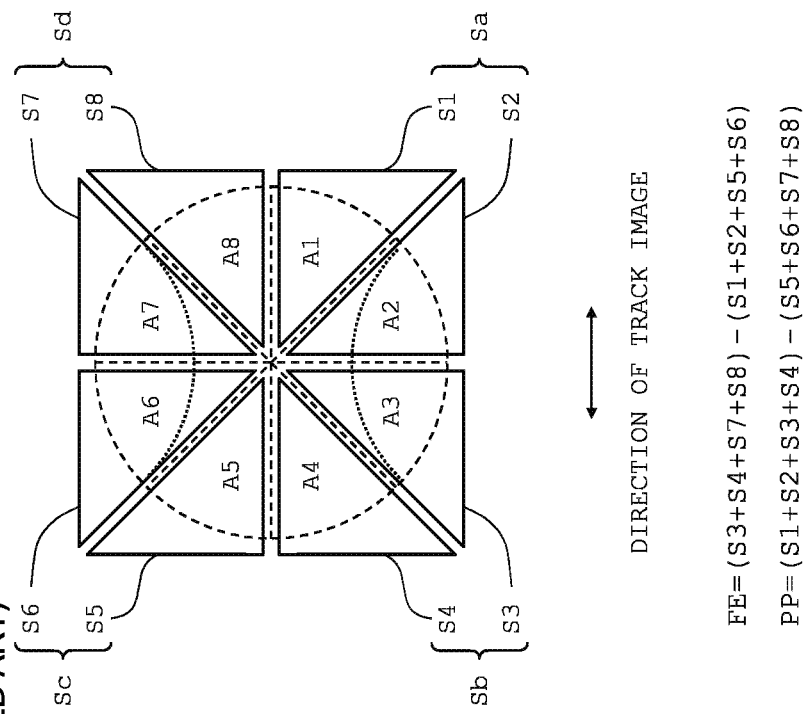
FIGS. 7A and 7B are diagrams for describing a sensor and a signal generating method based on a conventional astigmatism method.
Figure 7A:
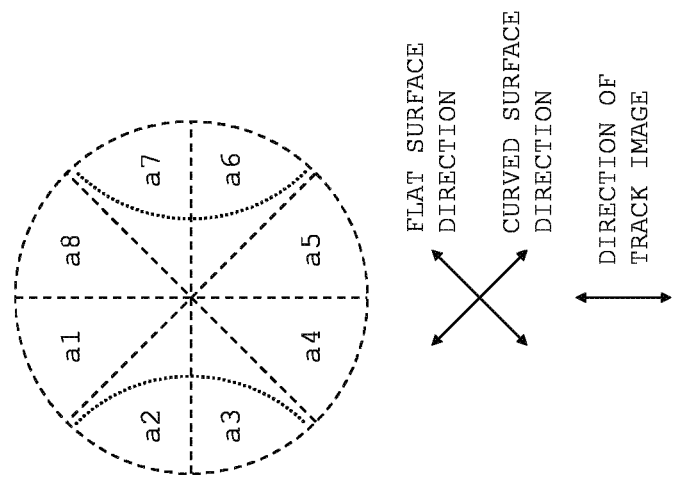

FIG. 7A is a diagram showing eight light flux areas a1 through a8 defined for reflected light from a disc, and FIG. 7B is a diagram showing irradiation areas of signal light and a sensor based on a conventional astigmatism method. The sensor shown in FIG. 7B is disposed on the plane P0 in the arrangement shown in FIG. 1A. FIG. 7B shows irradiation areas A1 through A8, on the plane P0, which are respectively irradiated with signal light passing through the light flux areas a1 through a8.

Referring to FIG. 7A, the direction of a diffraction image (a track image) of signal light resulting from a track groove has an inclination of 45 degrees with respect to the flat surface direction and with respect to the curved surface direction, and extends in up and down directions. Accordingly, in FIG. 7B, the direction of a track image of signal light extends in left and right directions. In FIGS. 7A, 7B, a track image is indicated by the dotted line.

Referring to FIG. 7B, in the conventional astigmatism method, a four-divided sensor composed of four sensing portions Sa through Sd is disposed on a light receiving surface of a photodetector. In this embodiment, to simplify the description, each of the sensing portions Sa through Sd is divided into two portions along the flat surface direction or along the curved surface direction. In other words, the sensing portion Sa is divided into sensing portions S1 and S2, the sensing portion Sb is divided into sensing portions S3 and S4, the sensing portion Sc is divided into sensing portions S5 and S6, and the sensing portion Sd is divided into sensing portions S7 and S8. In this arrangement, assuming that detection signals to be obtained by the sensing portions S1 through S8 are respectively expressed by S1 through S8, a focus error signal FE and a push-pull signal PP can be respectively acquired by the following equations (1) and (2).

$$FE=(S3+S4+S7+S8)-(S1+S2+S5+S6) \quad (1)$$

$$PP=(S1+S2+S3+S4)-(S5+S6+S7+S8) \quad (2)$$

Next, the sensor for receiving signal light shown in FIGS. 4B, 5B, 6B and a signal generating method are described.

Figure 8C:
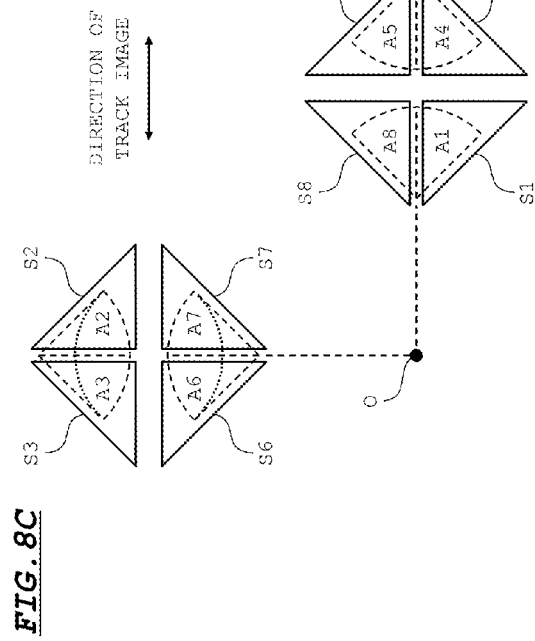
FIGS. 8A through 8C are diagrams for describing a sensor and a signal generating method based on the technical principle in the embodiment.
Figure 8A:
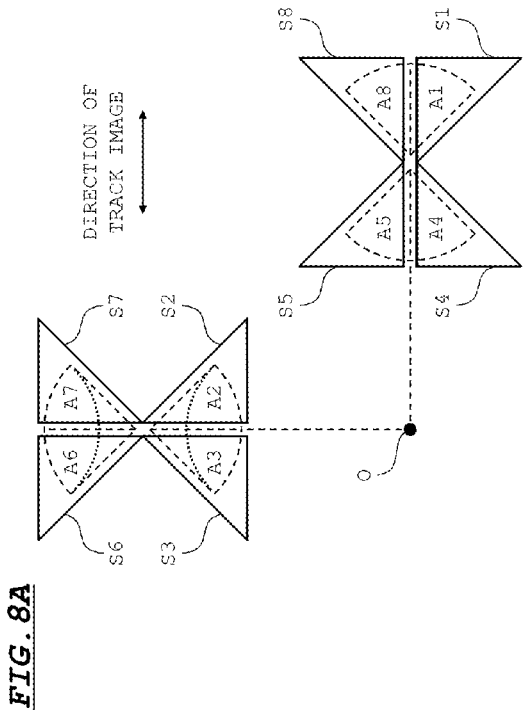
Figure 8B:
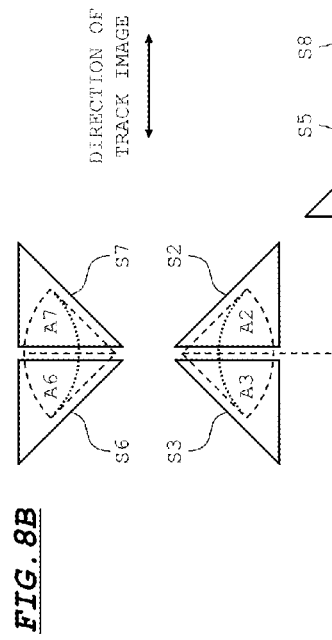

FIGS. 8A through 8C are diagrams respectively showing the sensing portions for receiving signal light whose propagating directions are changed, as shown in FIGS. 4A, 5A, 6A. In FIGS. 8A through 8C, the sensing portions S1 through S8 are disposed on the plane P0, and the direction of a track image extends in left and right directions.

If the propagating directions of signal light are changed as shown in FIG. 4A, signal light passing through the light flux areas a1 through a8 shown in FIG. 7A are respectively irradiated onto irradiation areas A1 through A8 shown in FIG. 8A. Likewise, if the propagating directions of signal light are changed as shown in FIGS. 5A, 6A, signal light passing through the light flux areas a1 through a8 are irradiated onto irradiation areas A1 through A8 shown in FIGS. 8B, 8C.

Accordingly, disposing the sensing portions S1 through S8 at the positions of the irradiation areas A1 through A8 of signal light, as shown in FIGS. 8A through 8C, enables to acquire a focus error signal FE and a push-pull signal PP by the equations (1) and (2) in the same manner as in the arrangement shown in FIG. 7B.

As described above, according to the technical principle in the embodiment, it is possible to generate a focus error signal and a push-pull signal (a tracking error signal) in which an influence of stray light is suppressed by performing the same computation process as applied to the conventional astigmatism method.

In the embodiment, as shown in FIGS. 8A through 8C, the sensing portions S1 through S8 are normally set to such a sufficiently large size as to include the irradiation areas A1 through A8. Configuring the sensing portions S1 through S8 as described above, however, may cause overlapping between an irradiation area other than the irradiation area as a target light receiving area, and the sensing portions S1 through S8 in FIG. 8A. Specifically, in FIG. 8A, the irradiation areas A3, A2 may overlap a lower end of the sensing portions S6, S7, the irradiation areas A6, A7 may overlap an upper end of the sensing portions S3, S2, the irradiation areas A5, A4 may overlap a left end of the sensing portions S8, S1, and the irradiation area A8, A1 may overlap a right end of the sensing portions S5, S4.

Further, in FIG. 8A, the irradiation areas of stray light 1, 2 as shown in FIG. 4B are distributed in addition to the irradiation area A1 through A8 of signal light. In this arrangement, the irradiation area of stray light 1 and the irradiation area of stray light 2 overlap each other substantially at the same position adjacent to the sensing portions S1 through S8. In this case, there is a likelihood that an interference fringe resulting from overlapping between stray light 1, 2 may be formed on the sensing portions S1 through S8.

On the other hand, in the case where the sensing portions S1 through S8 shown in FIGS. 8B, 8C receive signal light corresponding to the irradiation areas A1 through A8, with respect to the irradiation areas shown in FIGS. 5B, 6B, unlike the arrangement shown in FIG. 8A, it is less likely that an irradiation area other than the irradiation area as a target light receiving area may overlap the sensing portions S1 through S8, and an interference fringe resulting from overlapping between stray light 1, 2 is less likely to be formed on the sensing portions S1 through S8.

Specifically, in FIGS. 5B, 6B, the interval between two signal light arranged in up and down directions, and the interval between two signal light arranged in left and right directions are set to a larger value, as compared with the arrangement shown in FIG. 4B. With this arrangement, it is less likely that an irradiation area of signal light other than a target light receiving area may overlap the sensing portions S1 through S8 shown in FIGS. 8B, 8C. Further, as shown in FIGS. 5B, 6B, an area where stray light 1, 2 overlap each other is small, as compared with the arrangement shown in FIG. 4B, and is away from signal light. With this arrangement, it is less likely that an interference fringe resulting from overlapping between stray light 1, 2 may be formed on the sensing portions S1 through S8 shown in FIGS. 8B, 8C.

As described above, in the case where signal light is received on the sensing portions S1 through S8 shown in FIGS. 8B, 8C, it is possible to obtain a detection signal with high precision, as compared with the case where signal light is received on the sensing portions S1 through S8 shown in FIG. 8A.

The manner as to how light is separated as shown in FIGS. 5A, 6A corresponds to a manner as to how light is separated according to an embodiment of the invention.

In the following example, there is shown a concrete arrangement example of an optical pickup device based on the principle which is applied to the case where irradiation areas are distributed as shown in FIG. 6B or as shown in FIG. 7B.

Example

In the present example, a semiconductor laser 101 corresponds to a "laser light source" in the claims. A BD objective lens 114 corresponds to an "objective lens" in the claims. An anamorphic lens 115 corresponds to an "astigmatism element" in the claims. One of a flat surface direction and a curved surface direction corresponds to a "first direction" in the claims, and the other of the flat surface direction and the curved surface direction corresponds to a "second direction" in the claims. Sensing portions Ba1 to Ba4, Bs1 to Bs4 correspond to a "plurality of sensing portions" in the claims. A four-divided sensor Bz corresponds to a "four-divided sensor" in the claims. A four-divided sensor C1 corresponds to an "another four-divided sensor" and a "third four-divided sensor" in the claims. A four-divided sensor C2 corresponds to a "first four-divided sensor" in the claims. A four-divided sensor C3 corresponds to a "second four-divided sensor" in the claims. Diffraction areas H11, H12 and diffraction areas H21, H22 correspond to "first areas" in the claims. Diffraction areas H13, H14 and diffraction areas H23, H24 correspond to "second areas" in the claims. A diffraction area H15 and a diffraction area H25 correspond to a "third area" in the claims. A center O corresponds to a "reference point" in the claims. A process of S101 and processes of S211 through S212 correspond to a "step of adjusting a position of the light separating element in an optical axis direction of the laser light" in the claims. A process of S102 and processes of S221 through S222 correspond to a "step of adjusting a position of the light separating element in a rotating direction with respect to the reference point as a center" in the claims. The description regarding the correspondence between the claims and the present example is merely an example, and the claims are not limited by the description of the present example.

Further, in modification examples to be described later, diffraction areas H31, H32, diffraction areas H41, H42 and diffraction areas H51, H52 correspond to the "first areas" in the claims. Diffraction areas H33 to H36, diffraction areas H43 to H46 and diffraction areas H53, H54 correspond to the "second areas" in the claims. A diffraction area H37, a diffraction area H47 and a diffraction area H55 correspond to the "third area" in the claims. The description regarding the correspondence between the claims and the modification examples is merely an example, and the claims are not limited by the description of the modification examples.

The present example is an example, wherein the invention is applied to an optical pickup device compatible with BD, DVD and CD. The aforementioned principle is applied only to an optical system for BD, and a focus adjusting technology by a conventional astigmatism method and a tracking adjusting technology by a 3-beam method (an in-line method) are applied to an optical system for CD and an optical system for DVD.

FIGS. 9A, 9B are diagrams showing an optical system of an optical pickup device in the present example. FIG. 9A is a plan view of the optical system, wherein the arrangement of the optical system on the disc side with respect to rise-up mirrors 111, 112 is omitted, and FIG. 9B is a perspective side view of the optical system posterior to the rise-up mirrors 111, 112.

As shown in FIGS. 9A, 9B, the optical pickup device is provided with a semiconductor laser 101, a half wave plate 102, a two-wavelength laser 103, a diffraction grating 104, a dichroic mirror 105, a polarized beam splitter 106, a front monitor 107, a collimator lens 108, a driving mechanism 109, a quarter wave plate 110, the rise-up mirrors 111, 112, a two-wavelength objective lens 113, a BD objective lens 114, a light separating element H1, an anamorphic lens 115, and a photodetector 116.

The semiconductor laser 101 emits laser light (hereinafter, called as "BD light") for BD and having a wavelength of or about 405 nm. The half wave plate 102 adjusts the polarization direction of BD light in such a manner that the polarization direction of BD light is slightly displaced from the polarization direction of S-polarized light with respect to the polarized beam splitter 106. The two-wavelength laser 103 accommodates, in a certain CAN, two laser elements which emit laser light (hereinafter, called as "CD light") for CD and having a wavelength of or about 785 nm, and laser light (hereinafter, called as "DVD light") for DVD and having a wavelength of or about 660 nm. The two-wavelength laser 103 is disposed at such a position that the polarization directions of CD light and DVD light to be emitted from the two-wavelength laser 103 are slightly displaced from the polarization direction of S-polarized light with respect to the polarized beam splitter 106.

FIG. 9C is a diagram showing an arrangement of the laser elements (laser light sources) in the two-wavelength laser 103. FIG. 9C is a diagram of the two-wavelength laser 103 when viewed from the beam emission side. CD light and DVD light are respectively emitted from emission points 103a, 103b, and a predetermined gap is formed between the emission point 103a and the emission point 103b. As will be described later, the gap between the emission point 103a of CD light and the emission point 103b of DVD light is set to such a value that DVD light is properly irradiated onto four-divided sensors for DVD light. Accommodating two light sources in one CAN as described above is advantageous in simplifying the optical system, as compared with an arrangement provided with plural CANs.

Referring back to FIG. 9A, the diffraction grating 104 is a two-step diffraction grating, and separates each of CD light and DVD light into a main beam and two sub beams. The dichroic mirror 105 is internally formed with a dichroic surface 105a. The dichroic surface 105a reflects BD light and transmits CD light and DVD light. The semiconductor laser 101, the two-wavelength laser 103 and the dichroic mirror 105 are disposed at such positions that the optical axis of BD light reflected on the dichroic surface 105a, and the optical axis of CD light transmitted through the dichroic surface 105a are aligned with each other. The optical axis of DVD light transmitted through the dichroic surface 105a is displaced from the optical axes of BD light and CD light by the gap shown in FIG. 9C.

A part of each of BD light, CD light and DVD light is transmitted through the polarized beam splitter 106, and a main part thereof is reflected on the polarized beam splitter 106. As described above, the half wave plate 102, the two-wavelength laser 103 and the diffraction grating 104 are disposed at such positions that a part of each of BD light, CD light and DVD light is transmitted through the polarized beam splitter 106.

When the diffraction grating 104 is disposed at the position as described above, a main beam and two sub beams of CD light, and a main beam and two sub beams of DVD light are respectively aligned along the tracks of CD and DVD. The main beam and the two sub beams reflected on CD are irradiated onto four-divided sensors for CD on the photodetector 116 to be described later. The main beam and two sub beams reflected on DVD are irradiated onto the four-divided sensors for DVD on the photodetector 116 to be described later.

BD light, CD light, DVD light transmitted through the polarized beam splitter 106 is irradiated onto the front monitor 107. The front monitor 107 outputs a signal in accordance with a received light amount. The signal from the front monitor 107 is used for emission power control of the semiconductor laser 101 and the two-wavelength laser 103.

The collimator lens 108 converts BD light, CD light, DVD light to be entered from the side of the polarized beam splitter 106 into parallel light. The driving mechanism 109 moves the collimator lens 108 in the optical axis direction in accordance with a control signal for aberration correction. The driving mechanism 109 is provided with a holder 109a for holding the collimator lens 108, and a gear 109b for feeding the holder 109a in the optical axis direction of the collimator lens 108. The gear 109b is connected to a driving shaft of a motor 109c.

BD light, CD light, DVD light collimated by the collimator lens 108 is entered into the quarter wave plate 110. The quarter wave plate 110 converts BD light, CD light, DVD light to be entered from the side of the collimator lens 108 into circularly polarized light, and converts BD light, CD light, DVD light to be entered from the side of the rise-up mirror 111 into a linearly polarized light whose polarization direction is orthogonal to the polarization direction of BD light, CD light, DVD light at the time of incidence from the side of the collimator lens 108. By performing the above operation, light reflected on a disc is transmitted through the polarized beam splitter 106. The optical axis of reflected light from a disc, which is transmitted through the polarized beam splitter 106, is aligned with Z axis shown in FIG. 9A.

The rise-up mirror 111 is a dichroic mirror. The rise-up mirror 111 transmits BD light, and reflects CD light and DVD light in a direction toward the two-wavelength objective lens 113. The rise-up mirror 112 reflects BD light in a direction toward the BD objective lens 114.

The two-wavelength objective lens 113 is configured to properly focus CD light and DVD light on CD and DVD, respectively. Further, the BD objective lens 114 is configured to properly focus BD light on BD. The two-wavelength objective lens 113 and the BD objective lens 114 are driven by an objective lens actuator 122 in a focus direction and in a tracking direction, while being held on a holder 121.

The light separating element H1 distribute laser light passing through light flux areas shown in FIG. 6A, on the plane P0, as shown in FIG. 6B. The configuration of the light separating element H1 will be described later referring to FIGS. 10A through 10C.

The anamorphic lens 115 corresponds to the anamorphic lens shown in FIG. 1A, and introduces astigmatism to BD light, CD light, DVD light to be entered from the side of the light separating element H1. BD light, CD light, DVD light transmitted through the anamorphic lens 115 is entered into the photodetector 116. The photodetector 116 is provided with a plurality of sensors for receiving light. The sensors on the photodetector 116 will be described later referring to FIG. 11.

FIG. 10A is a plan view of the light separating element H1 when viewed from the side of the polarized beam splitter 106. FIG. 10B is a diagram showing light flux areas a11 through a15 obtained by dividing laser light to be entered into the light separating element H1 along borderlines of diffraction areas H11 through H15 of the light separating element H1. FIG. 10A also shows the flat surface direction, the curved surface direction and the direction of a track image.

The light separating element H1 is made of a square transparent plate, and has a two-step diffraction pattern (a diffraction hologram) on a light incident surface thereof. As shown in FIG. 10A, the light incident surface of the light separating element H1 is divided into five diffraction areas H11 through H15. The diffraction area H15 has such a large size as to suppress degradation of a detection signal resulting from stray light of BD light, and has such a small size as to properly obtain a tracking error signal TE based on BD light, which will be described later.

The diffraction areas H11 through H15 divide laser light passing through the light flux areas a11 through a15 into zero-th order diffraction light, plus first order diffraction light, minus first order diffraction light by diffraction. Plus first order diffraction light of laser light passing through the light flux areas a11 through a15 is diffracted in the directions shown by solid line arrows (V21 through V25) in FIG. 10A. Minus first order diffraction light of laser light passing through the light flux areas a11 through a15 is diffracted in the directions shown by dotted line arrows (V21m through V25m) in FIG. 10A. Zero-th order diffraction light of laser light passing through the light flux areas a11 through a15 is transmitted through the diffraction areas H11 through H15 without diffraction.

In FIG. 10A, diffraction directions and magnitudes of diffraction (diffraction angles) to be given to laser light by the diffraction areas H11 through H15 are indicated by the vectors V21 through V25 and the vectors V21m through V25m. The propagating directions of plus first order diffraction light to be generated by the diffraction areas H11 through H15 are respectively obtained by adding the vectors V21 through V25 to the propagating directions of laser light before incidence into the diffraction areas H11 through H15. The propagating directions of minus first order diffraction light to be generated by the diffraction areas H11 through H15 are respectively obtained by adding the vectors V21m through V25m to the propagating directions of laser light before incidence into the diffraction areas H11 through H15.

As well as the arrangement shown in FIG. 6A, the directions of the vectors V21 and V22 coincide with each other, and the directions of the vectors V23 and V24 coincide with each other. Further, as well as the arrangement shown in FIG. 6A, the magnitude of the vector V21 is larger than the magnitude of the vector V22, and the magnitude of the vector V24 is larger than the magnitude of the vector V23. The vectors V21m through V24m respectively have directions opposite to those of the vectors V21 through V24 and have magnitudes equal to those of the vectors V21 through V24.

In the present example, the diffraction area H15 is operable to change the propagating direction of laser light passing through the light flux area a15, unlike the arrangement shown in FIG. 6A. The directions of the vectors V25, V25m to be given by the diffraction area H15 are in parallel to the flat surface direction, and the magnitudes of the vectors V25, V25m are equal to each other.

The directions of the vectors V21 through V25, V21m through V25m are determined by the orientation of a diffraction pattern to be set for each diffraction area, and the magnitudes of the vectors V21 through V25, V21m through V25m are determined by the pitch of a diffraction pattern to be set for each diffraction area.

FIG. 10C is a diagram showing the relations between a step height and a diffraction efficiency of the diffraction areas H11 through H15.

As shown in FIG. 10C, the diffraction efficiencies of BD light, DVD light, CD light to be entered into the light separating element H1 are changed by the step height of a two-step diffraction pattern, which is set for the diffraction areas H11 through H15. The step height in the present example is set to the "setting value" shown in FIG. 10C. At the setting value, the diffraction efficiencies of zero-th order diffraction light and plus first order diffraction light of BD light are respectively set to about 80% and about 10%, and the diffraction efficiencies of zero-th order diffraction light of DVD light and zero-th order diffraction light of CD light are set to about 90% or more. The diffraction efficiency of minus first order diffraction light is substantially the same as the diffraction efficiency of plus first order diffraction light.

As described above, BD light entered into the light separating element H1 is divided into zero-th order diffraction light, plus first order diffraction light, minus first order diffraction light with the respective diffraction efficiencies. Further, a main part of CD light and DVD light entered into the light separating element H1 is transmitted through the light separating element H1 without being diffracted by the light separating element H1.

Figure 11:
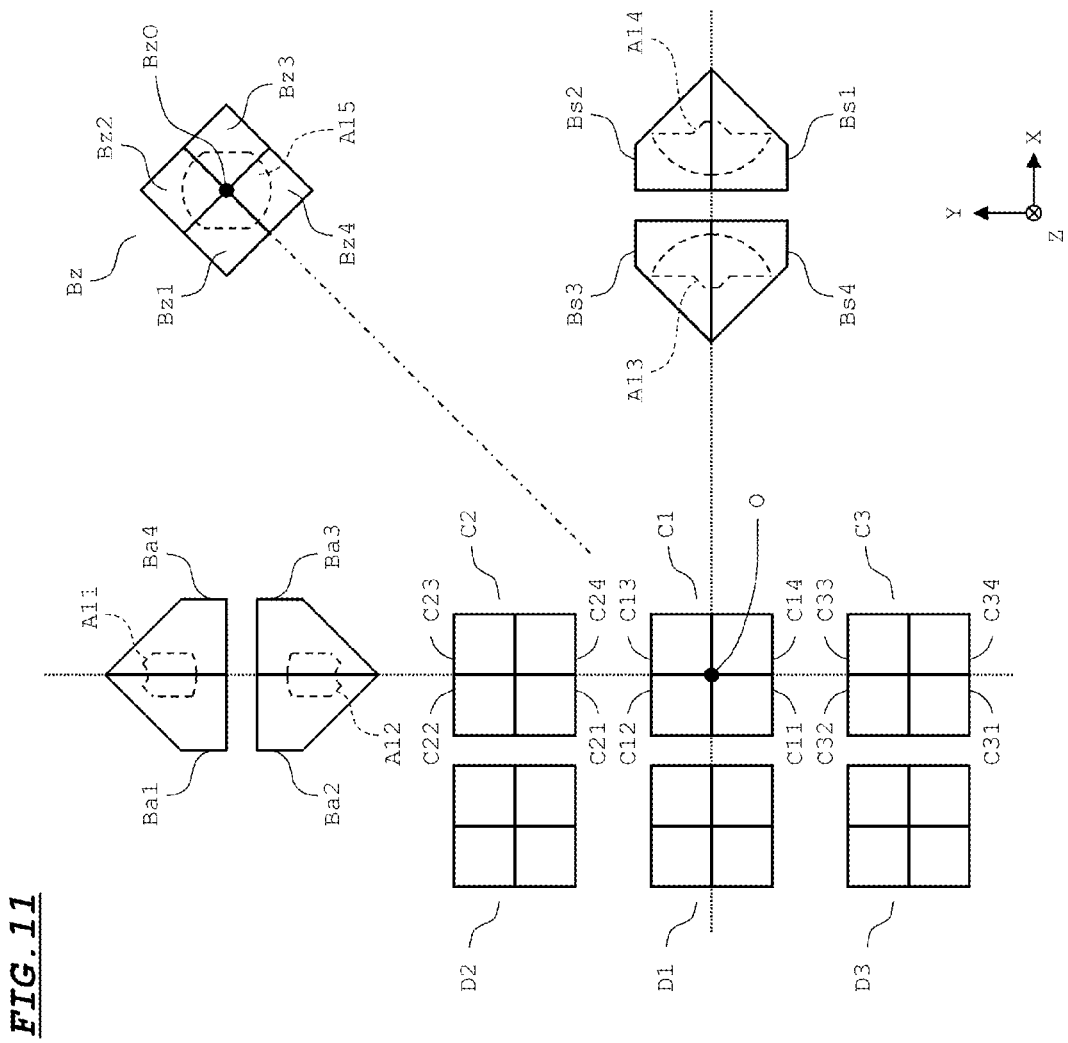
FIG. 11 is a diagram showing a sensor layout of a photodetector in the example.

FIG. 11 is a diagram showing a sensor layout of the photodetector 116.

The photodetector 116 has BD sensing portions Ba1 through Ba4, Bs1 through Bs4 for receiving plus first order diffraction light of BD light (signal light) to be generated by the diffraction function of the diffraction areas H11 through H14; a four-divided sensor Bz for receiving plus first order diffraction light of BD light (signal light and stray light 1, 2) to be generated by the diffraction function of the diffraction area H15; four-divided sensors C1 through C3 for receiving CD light transmitted through the light separating element H1 without being diffracted by the light separating element H1; and four-divided sensors D1 through D3 for receiving DVD light transmitted through the light separating element H1 without being diffracted by the light separating element H1. The sensing portions Ba1 through Ba4, Bs1 through Bs4 are respectively disposed at the same positions as the sensing portions S1 through S8 shown in FIG. 8C, which have been described for explaining the aforementioned principle. The four-divided sensor C1 is also used for receiving zero-th order diffraction light of BD light to be described later.

A center O of the photodetector 116 is an intersection at which the optical axis of BD light to be emitted from the polarized beam splitter 106 in plus Z-axis direction intersects a light receiving surface of the photodetector 116.

Plus first order diffraction light of BD light (signal light) passing through the light flux areas a11 through a15 is irradiated onto irradiation areas A11 through A15. Light corresponding to the irradiation area A11 is received by the sensing portions Ba1, Ba4, light corresponding to the irradiation area A12 is received by the sensing portions Ba2, Ba3, light corresponding to the irradiation area A13 is received by the sensing portions Bs3, Bs4, and light corresponding to the irradiation area A14 is received by the sensing portions Bs1, Bs2.

Plus first order diffraction light of BD light (signal light and stray light 1, 2) passing through the light flux area a15 is entered into the four-divided sensor Bz located at an upper right position with respect to the center O. The four-divided sensor Bz is composed of sensing portions Bz1 through Bz4, and is used for adjusting the position of the light separating element H1. The four-divided sensor Bz is disposed with an inclination of 45 degrees with respect to up and down directions and with respect to left and right directions. Further, the four-divided sensor Bz is disposed at such a position that a parting line of the four-divided sensor Bz is aligned with a straight line shown by the one-dotted chain line in FIG. 11, which connects between the center O and a center BzO of the four-divided sensor Bz. The position adjustment of the light separating element H1 will be described later referring to FIG. 14.

As shown in FIG. 11, the pitch of the diffraction areas H11 through H14 is set in such a manner that the irradiation areas A11 through A14 are located at the sensing portions Ba1 through Ba4, Bs1 through Bs4. Further, the pitch of the diffraction area H15 is set in such a manner that plus first order diffraction light of BD light (signal light and stray light 1, 2) passing through the light flux area a15 is located at the center BzO of the four-divided sensor Bz.

Since the optical axes of BD light and CD light are aligned by the dichroic surface 105a as described above, a main beam (zero-th order diffraction light) of CD light generated by the diffraction grating 104, and zero-th order diffraction light of BD light are irradiated at the center O shown in FIG. 11. The four-divided sensor C1 is disposed at the center O. The four-divided sensors C2, C3 are disposed in the direction of a track image of CD with respect to a main beam of CD light, on the light receiving surface of the photodetector 116, to receive sub beams of CD light. The four-divided sensors C1, C2 and C3 are respectively composed of sensing portions C11 through C14, sensing portions C21 through C24 and the sensing portions C31 through C34.

In the present example, the four-divided sensors C2, C3 are disposed at such positions that a parting line of the four-divided sensor C2 and a parting line of the four-divided sensor C3 are located on a straight line extending in up and down directions and passing the center O for implementing a tracking adjusting technology by an in-line method.

Since the optical axis of DVD light is displaced from the optical axis of CD light as described above, a main beam and two sub beams of DVD light are irradiated at positions displaced from the irradiation positions of a main beam and two sub beams of CD light, on the light receiving surface of the photodetector 116. The four-divided sensors D1 through D3 are disposed at the irradiation positions of a main beam and two sub beams of DVD light. The distance between a main beam of CD light and a main beam of DVD light is determined by the gap between the emission point 103a of CD light and the emission point 103b of DVD light shown in FIG. 9C.

Figure 12:
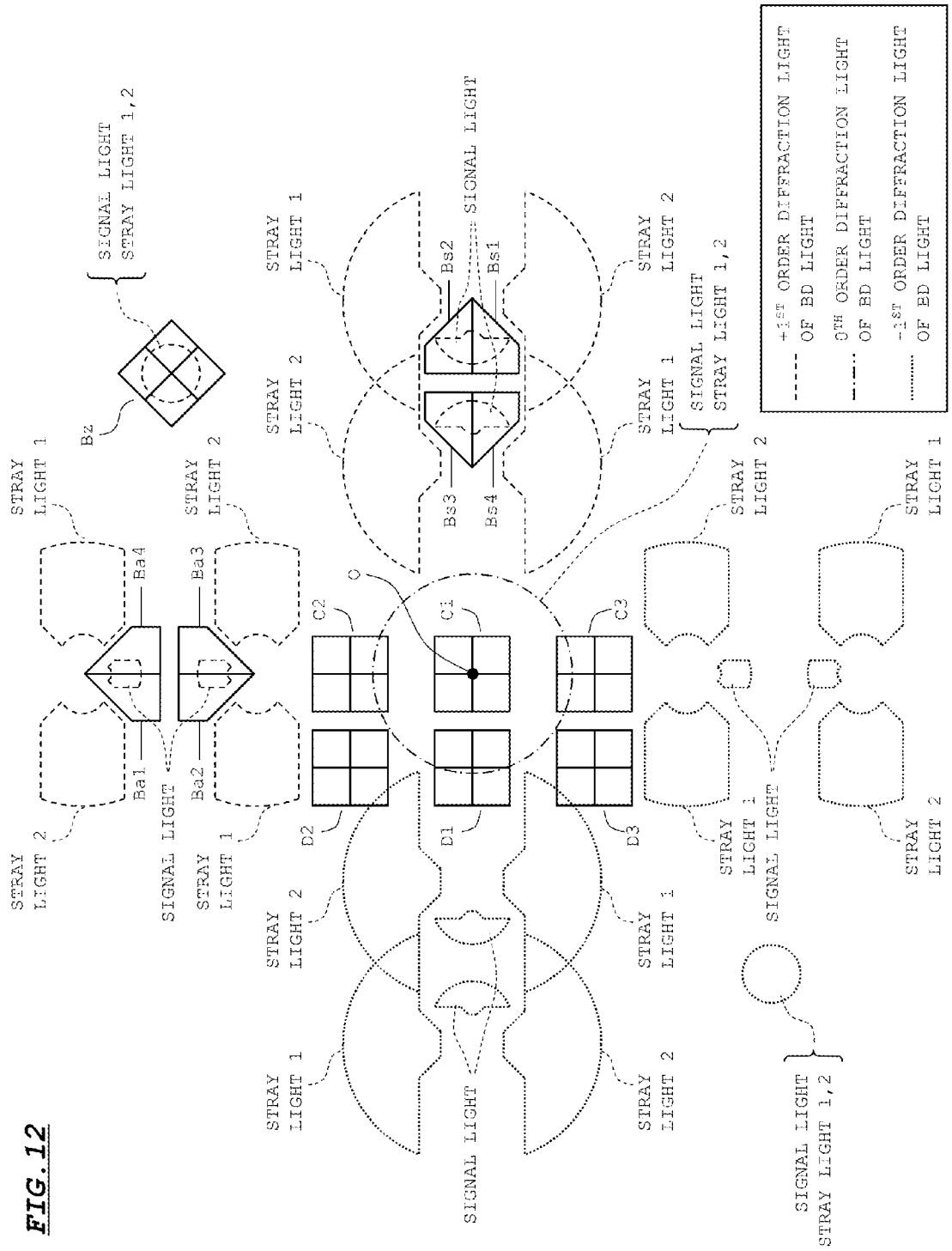
FIG. 12 is a schematic diagram showing irradiation areas of zero-th order diffraction light, plus first order diffraction light, minus first order diffraction light in the example.

FIG. 12 is a schematic diagram showing irradiation areas of zero-th order diffraction light, plus first order diffraction light, minus first order diffraction light of BD light (signal light and stray light 1, 2) distributed on a plane (plane P0) flush with the light receiving surface of the photodetector 116. The broken line indicates plus first order diffraction light of BD light, the long-chain line indicates zero-th order diffraction light of BD light, the dotted line indicates minus first order diffraction light of BD light. FIG. 12 also shows the sensors shown in FIG. 11.

Forming a two-step diffraction pattern on the diffraction areas H11 through H15 of the light separating element H1, as described in the present example, allows to distribute the irradiation areas of plus first order diffraction light and minus first order diffraction light of BD light (signal light and stray light 1, 2) symmetrically to each other with respect to the center O, and allows to distribute the irradiation area of zero-th order diffraction light at the center O. In the present example, regarding BD light (signal light and stray light 1, 2), only zero-th order diffraction light and plus first order diffraction light are used, and minus first order diffraction light is not used.

Further, since a central part of BD light to be entered into the light separating element H1 is irradiated near the four-divided sensor Bz, which is away from the center O, it is less likely that the irradiation areas of plus first order diffraction light of stray light (stray light 1, 2) of BD light distributed near the sensing portions Ba1 through Ba4, Bs1 through Bs4 may overlap the sensing portions Ba1 through Ba4, Bs1 through Bs4. Specifically, the irradiation areas of stray light 1, 2 distributed near an upper end of the sensing portions Ba1, Ba4 respectively have such shapes that a left end of the irradiation area of stray light 1 and a right end of the irradiation area of stray light 2 are removed by the diffraction area H15. Likewise, the irradiation areas of stray light 1, 2 distributed near a lower end of the sensing portions Ba2, Ba3, near a right end of the sensing portions Bs1, Bs2, near a left end of the sensing portions Bs3, Bs4 each has such a shape that an end thereof is removed by the diffraction area H15. With this arrangement, even if the BD objective lens 114 is moved in a radial direction of BD, and the optical axis of the BD objective lens 114 is shifted from the optical axis of laser light, it is less likely that plus first order diffraction light of BD light (stray light 1, 2) may be entered into the sensing portions Ba1 through Ba4, Bs1 through Bs4. Further, even if the positions of the sensing portions Ba1 through Ba4, Bs1 through Bs4 are displaced on the light receiving surface of the photodetector 116, it is less likely that plus first order diffraction light of BD light (stray light 1, 2) may be entered into the sensing portions Ba1 through Ba4, Bs1 through Bs4.

In the following, a signal generating method in the present example is described.

As shown in FIG. 11, the irradiation areas A11 through A14 of plus first order diffraction light of BD light (signal light) are located on the sensing portions Ba1 through Ba4, Bs1 through Bs4. In the present example, a tracking error signal TE for BD is generated, based on detection signals from these sensing portions. Assuming that detection signals from the sensing portions Ba1 through Ba4, Bs1 through Bs4 are respectively represented as Ba1 through Ba4, Bs1 through Bs4, the tracking error signal TE in the present example can be acquired by the following equation (3).

$$TE=\{(Ba1+Ba4)-(Ba2+Ba3)\}-k\times(Bs1+Bs4)-(Bs2+Bs3)\} \qquad (3)$$

In this example, the multiplier k is used, unlike the computation of the push-pull signal PP expressed by the equation (2). The computation approach of a tracking error signal TE using the multiplier k is disclosed in Japanese Unexamined Patent Publication No. 2010-102813 (corresponding to U.S. Patent Application Publication No. US2010/0080106 A1) filed by the applicant of the present application, and the disclosure of U.S. Patent Application Publication No. 2010/0080106 A1 is incorporated by reference herein. The tracking error signal TE may be acquired by using the computation approach by the equation (2).

Further, as shown in FIG. 12, the irradiation areas of zero-th order diffraction light of BD light (signal light and stray light 1, 2) are located on the four-divided sensor C1. In the present example, a focus error signal FE and an RF signal for BD are generated, based on detection signals from the sensing portions C11 through C14 (see FIG. 11) of the four-divided sensor C1. Assuming that detections signals from the sensing portions C11 through C14 are respectively expressed as C11 through C14, the focus error signal FE in the present example can be acquired by the following equation (4) in the same manner as acquiring the focus error signal FE by the equation (1). Further, the RF signal in the present example can be acquired by the following equation (5).

$$FE=(C11+C13)-(C12+C14) \qquad (4)$$

$$RF=(C11+C12+C13+C14) \qquad (5)$$

Zero-th order diffraction light of BD light to be entered into the four-divided sensor C1 not only includes signal light but also includes stray light 1, 2. However, since the ratio of stray light to zero-th order diffraction light of BD light to be entered into the four-divided sensor C1 is about 1/10, there is no or less likelihood that stray light may seriously affect acquisition of a focus error signal FE and an RF signal.

A focus error signal, a tracking error signal and an RF signal for CD are generated based on detection signals from the four-divided sensors C1 through C3, and a focus error signal, a tracking error signal and an RF signal for DVD are generated based on detection signals from the four-divided sensors D1 through D3. The focus error signals and the tracking error signals for CD and DVD are generated by using a computation process by a conventional astigmatism method and a computation process by a 3-beam method (an in-line method).

As described above, in the present example, only plus first order diffraction light of BD light (signal light) is irradiated onto the sensing portions Ba1 through Ba4, Bs1 through Bs4. Further, a central part of BD light to be entered into the light separating element H1 is also irradiated onto a position near the four-divided sensor Bz, which is away from the center O, by the diffraction area H15. Accordingly, the irradiation areas of plus first order diffraction light of stray light (stray light 1, 2) of BD light distributed near the sensing portions Ba1 through Ba4, Bs1 through Bs4 are less likely to overlap the sensing portions Ba1 through Ba4, Bs1 through Bs4. With the above arrangement, it is possible to acquire various detection signals (e.g. a tracking error signal TE) with high precision while suppressing degradation of detection signals resulting from stray light.

Furthermore, in the present example, the light separating element H1 having a two-step diffraction pattern is used to distribute the irradiation areas of BD light, as shown in FIG. 6B. Forming the two-step diffraction pattern as described above results in widely distributing the irradiation areas as shown in FIG. 12. In the present example, however, there is no need of disposing sensors on a photodetector at such positions as to include all the irradiation areas. Specifically, in the present example, the sensors on the photodetector 116 for receiving BD light are disposed at such positions as to include only the irradiation areas of signal light (zero-th order diffraction light) distributed at the center O, signal light (plus first order diffraction light) distributed on the upper side and the right side of the center O, and signal light (plus first order diffraction light) distributed on the upper right portion of the photodetector 116. With this arrangement, it is possible to miniaturize the photodetector 116, even with use of the inexpensive two-step light separating element H1, as described in the present example.

Alternatively, it is possible to use a light separating element having a blazed diffraction pattern for distributing the irradiation areas as shown in FIG. 6B. The light separating element having a blazed diffraction pattern, however, is expensive, as compared with the light separating element H1 having a two-step diffraction pattern as employed in the present example. In the present example, use of the light separating element H1 having an inexpensive two-step diffraction pattern is advantageous in suppressing the cost required for the optical pickup device.

Further, in the present example, since the zero-th order diffraction light of BD light (signal light and stray light 1, 2) is entered into the center O of the photodetector 116, it is possible to acquire a focus error signal FE and an RF signal for BD by the four-divided sensor C1 for CD. Specifically, it is possible to use apart of the four-divided sensors C1 through C3 for CD for acquiring a focus error signal FE and an RF signal for BD. With this arrangement, it is possible to suppress the cost required for the optical pickup device without the need of providing an additional sensor, and to miniaturize the photodetector.

In the present example, the light separating element H1 and the sensors on the photodetector 116 are configured, based on the arrangement that the sensing portions S1 through S8 are disposed as shown in FIG. 8C with respect to the irradiation areas shown in FIG. 6B. Alternatively, the light separating element H1 and the sensors on the photodetector 116 may be configured, based on an arrangement that the sensing portions S1 through S8 are disposed as shown in FIG. 8B with respect to irradiation areas shown in FIG. 5B.

Figures 13A, 13B:
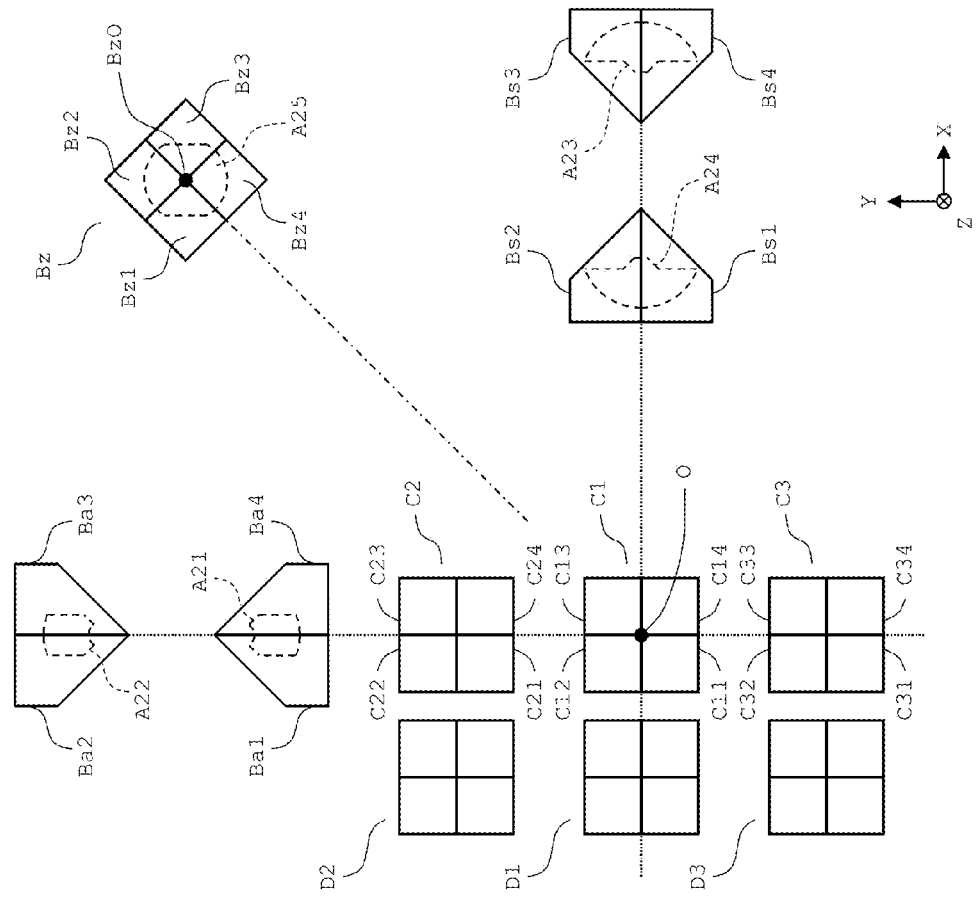
FIG. 13A is a plan view of a light separating element and FIG. 13B is a diagram showing a sensor layout of a photodetector as a modification of the example.

FIG. 13A is a plan view showing a light separating element H2 as the above modification example.

Diffraction areas H21 through H25 of the light separating element H2 are configured in such a manner that vectors V11 through V15 are imparted to plus first order diffraction light, and vectors V11$m$ through V15$m$ are imparted to minus first order diffraction light. As well as the arrangement shown in FIG. 5A, the directions of the vectors V11 and V12 coincide with each other, and the directions of the vectors V13 and V14 coincide with each other. Further, as well as the arrangement shown in FIG. 5A, the magnitude of the vector V12 is larger than the magnitude of the vector V11, and the magnitude of the vector V13 is larger than the magnitude of the vector V14. The vectors V11$m$ through V14$m$ respectively have directions opposite to those of the vectors V11 through V14 and have magnitudes equal to those of the vectors V11 through V14. The vectors V15 and V15$m$ are respectively the same as the vectors V25 and V25$m$ shown in FIG. 10A.

FIG. 13B is a diagram showing a sensor layout of the photodetector 116 in the case where the light separating element H2 is used.

In the above arrangement, the sensing portions Ba1, Ba4 shown in FIG. 11 are disposed at a lower side of the sensing portions Ba2, Ba3, and the sensing portions Bs1, Bs2 shown in FIG. 11 are disposed at a left side of the sensing portions Bs3, Bs4 in the same manner as the positions of the sensing portions S1 through S8 shown in FIG. 8B. Plus first order diffraction light of BD light (signal light) to be entered into the diffraction areas H21 through H25 is irradiated onto irradiation areas A21 through A25. With this arrangement, it is possible to receive only plus first order diffraction light of BD light (signal light) in the manner distributed as shown in FIG. 5B.

Position Adjusting Method

In the foregoing example, it is necessary to adjust the positions of the light separating element H1 and the photodetector 116 in the optical pickup device in such a manner that plus first order diffraction light of BD light (signal light) passing through the light flux areas a11 through a14 shown in FIG. 10B is properly entered into the sensing portions Ba1 through Ba4, Bs1 through Bs4 shown in FIG. 11. The above adjustment can be performed by the following method.

FIG. 14 is a diagram showing a position adjusting process for the optical pickup device in the present example. The position adjustment is carried out at the time of assembling the optical pickup device.

In the position adjusting process, firstly, the optical elements other than the light separating element H1 and the photodetector 116 are mounted in the optical pickup device (S11). Then, the light separating element H1 held on a holder is mounted in the optical pickup device (S12). Then, the photodetector 116 loaded with the sensors shown in FIG. 11 on the light receiving surface thereof is mounted in the optical pickup device (S13). When the above operation is performed, an arm for position adjustment is connected to the photodetector 116 so that position adjustment to be described later can be automatically carried out.

Then, electric power is supplied to the optical pickup device (S14). By supply of the electric power, the semiconductor laser 101 is turned on to emit light, and a disc (e.g. an ROM having one recording layer) loaded for position adjustment is rotated, and BD light is irradiated onto the disc. Then, the objective lens actuator 122 is driven in the above state, and the collimator lens 108 is positioned at a predetermined position.

Then, a position adjustment (XY-adjustment) of the photodetector 116 is carried out in a plane (XY plane shown in FIG. 9A) perpendicular to the optical axis of BD light to be emitted from the side of the polarized beam splitter 106 in plus Z-axis direction. The XY-adjustment of the photodetector 116 is carried out based on detection signals from the sensing portions C11 through C14 for CD, which receive zero-th order diffraction light of BD light. Specifically, assuming that displacement amounts in X-axis direction and in Y-axis direction of the photodetector 116 are represented as PDx, PDy, PDx, PDy can be acquired by the following equations (6), (7).

$$PDx=\{(C13+C14)-(C11+C12)\}/(C11+C12+C13+C14) \quad (6)$$

$$PDy=\{(C12+C13)-(C11+C14)\}/(C11+C12+C13+C14) \quad (7)$$

Then, the position of the photodetector 116 is roughly adjusted in such a range as to be adjustable by PDx, PDy expressed by the equations (6), (7) (S15). Then, automatic XY-adjustment control for the photodetector 116 is turned on in such a manner that the values of PDx, PDy expressed by the equations (6), (7) are set to zero (S16). By performing the above operation, the arm connected to the photodetector 116 is operable to move the photodetector 116 in XY plane so that the optical axis of zero-th order diffraction light of BD light coincides with the center O of the photodetector 116.

Then, focus servo control is turned on (S17), and the BD objective lens 114 is moved in Y-axis direction (a direction perpendicular to a disc) shown in FIG. 9B by the objective lens actuator 122 in such a manner that the value of the focus error signal FE expressed by the equation (4) is set to zero.

Then, a position adjustment (Z-adjustment) of the photodetector 116 in Z-axis direction is carried out (S18). In the Z-adjustment of the photodetector 116, firstly, the BD objective lens 114 is moved in a radial direction of a disc in such a manner that the tracking error signal TE expressed by the equation (3) is set to zero. Then, the BD objective lens 114 is moved in a direction perpendicular to the disc, while referring to the RF signal expressed by the equation (5). When the above operation is performed, the focal point of BD light (signal light and stray light 1, 2) entered into the four-divided sensor C1 is changed as the BD objective lens 114 is moved, and the amplitude of the RF signal is changed as the focal point is changed. The position of the photodetector 116 in Z-axis direction is determined in such a manner that the amplitude of the RF signal has a predetermined magnitude.

Then, a position adjustment (XY-adjustment) of the light separating element H1 in XY plane is carried out (S19). The XY-adjustment of the light separating element H1 is carried out based on detection signals from the sensing portions Ba1 through Ba4, Bs1 through Bs4 shown in FIG. 11. Specifically, assuming that displacement amounts of the light separating element H1 in X-axis direction and in Y-axis direction are respectively represented as HOEx, HOEy, HOEx, HOEy can be acquired by the following equations (8), (9).

$$HOEx=\{(Bs3+Bs4)-(Bs1+Bs2)\}/(Bs1+Bs2+Bs3+Bs4) \quad (8)$$

$$HOEy=\{(Ba2+Ba3)-(Ba1+Ba4)\}/(Ba1+Ba2+Ba3+Ba4) \quad (9)$$

The light separating element H1 is positioned in such a manner that the values of HOEx, HOEy expressed by the equations (8), (9) are set to zero in XY-plane.

Then, a position adjustment (Z-adjustment) of the light separating element H1 in Z-axis direction, and a position adjustment (θ-adjustment) of the light separating element H1 in a rotating direction with respect to the center O are carried out (S20). The Z-adjustment and the θ-adjustment (Zθ-adjustment) of the light separating element H1 are carried out based on detection signals from the four-divided sensor Bz (sensing portions Bz1 through Bz4) for receiving plus first order diffraction light of BD light. Specifically, assuming that detection signals from the sensing portions Bz1 through Bz4 are respectively represented as Bz1 through Bz4, and a displacement amount of the light separating element H1 in Z-axis direction and a displacement amount of the light separating element H1 in a rotating direction with respect to the center O are respectively expressed as HOEz, HOEθ, HOEz, HOEθ can be acquired by the following equations (10), (11).

$$HOEz=\{(Bz1+Bz4)-(Bz2+Bz3)\}/(Bz1+Bz2+Bz3+Bz4) \quad (10)$$

$$HOE\theta=\{(Bz1+Bz2)-(Bz3+Bz4)\}/(Bz1+Bz2+Bz3+Bz4) \quad (11)$$

The light separating element H1 is positioned in such a manner that the value of HOEz expressed by the equation (10) is set to zero in Z-axis direction, and that the value of HOEθ expressed by the equation (11) is set to zero in a rotating direction with respect to the center O. In the Zθ-adjustment of the light separating element H1 in S20, the Z-adjustment and the θ-adjustment of the light separating element H1 are carried out alternately or concurrently as follows.

Figure 14A:
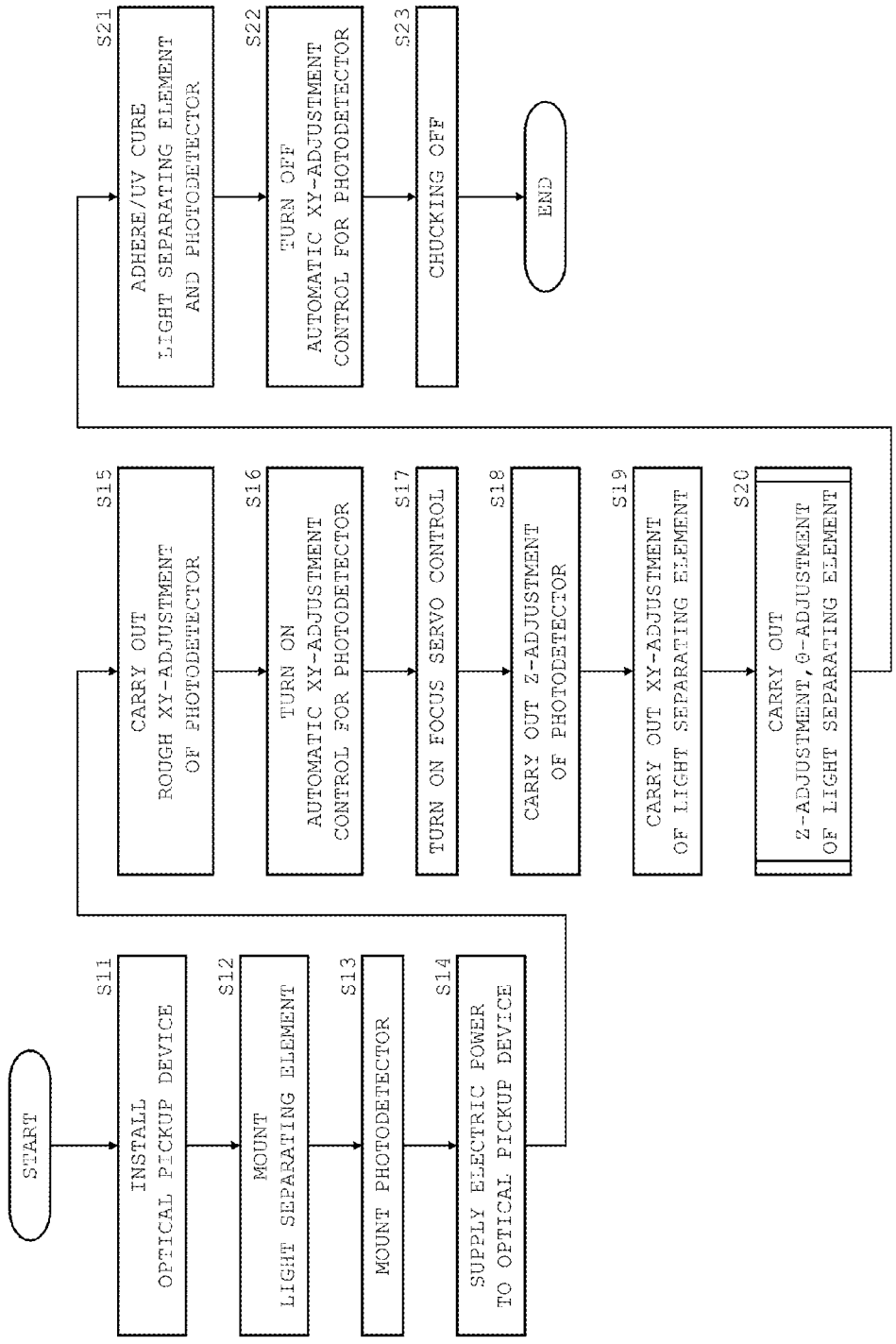
FIGS. 14A through 14F are diagrams showing a position adjusting process for the optical pickup device in the example.
Figure 14B:
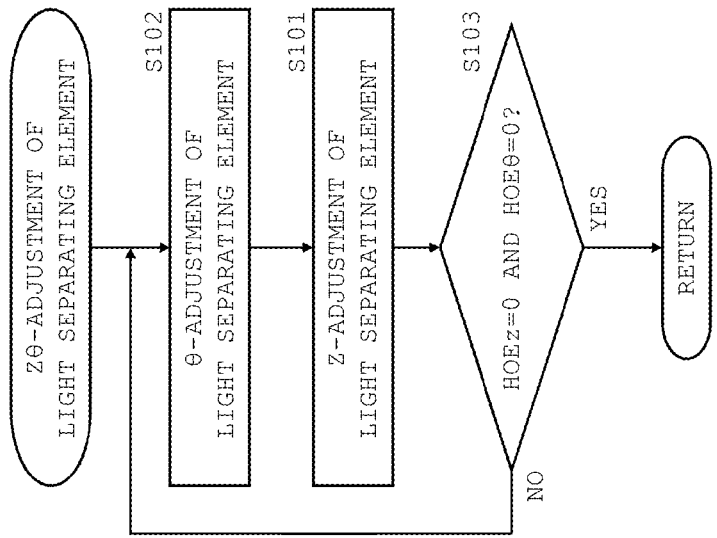

FIG. 14B is a flowchart showing the Zθ-adjustment of the light separating element H1, in the case where the Z-adjustment and the θ-adjustment of the light separating element H1 are alternately carried out.

Figure 14C:
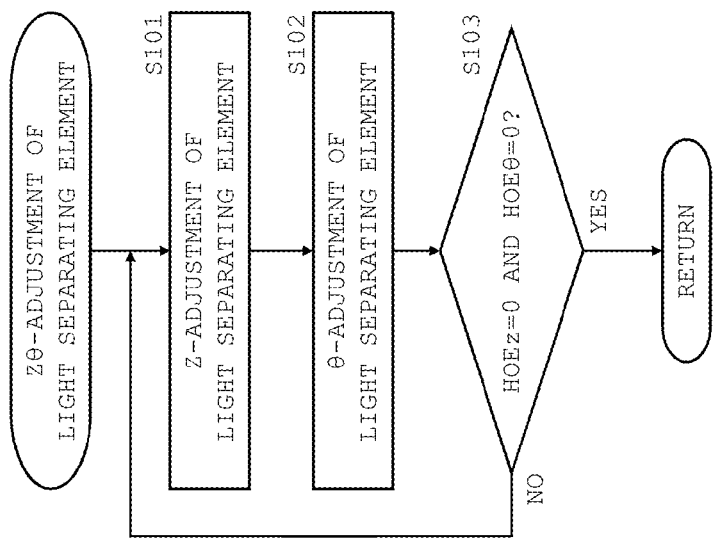

In the above arrangement, firstly, the Z-adjustment of the light separating element H1 is carried out in such a manner that the value of HOEz is set to zero (S101). Then, the θ-adjustment of the light separating element H1 is carried out in such a manner that the value of HOEθ is set to zero (S102). Then, if it is not judged that HOEz=0 and HOEθ=0 (S103: NO), the process is returned to S101, and the Z-adjustment and the θ-adjustment of the light separating element H1 are carried out. If it is judged that HOEz=0 and HOEθ=0 (S103: YES), the Zθ-adjustment of the light separating element H1 is ended. Alternatively, in FIG. 14B, the order of the processes of S101 and S102 may be reversed, and the Zθ-adjustment of the light separating element H1 may be carried out as shown in FIG. 14C.

Figure 14F:
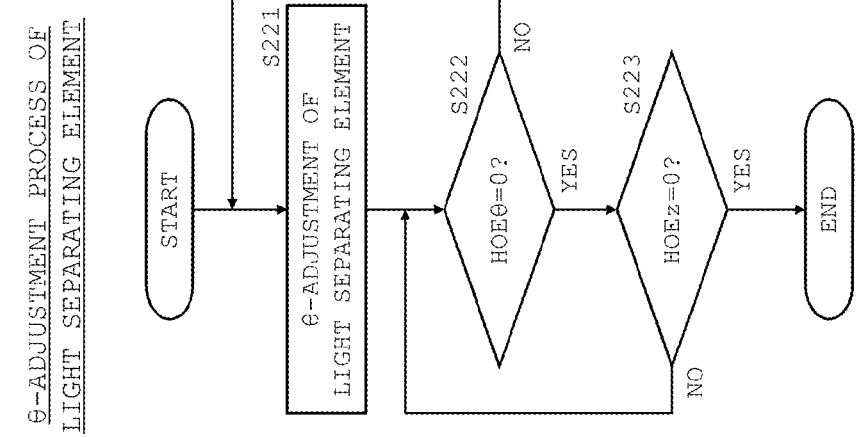
Figure 14E:
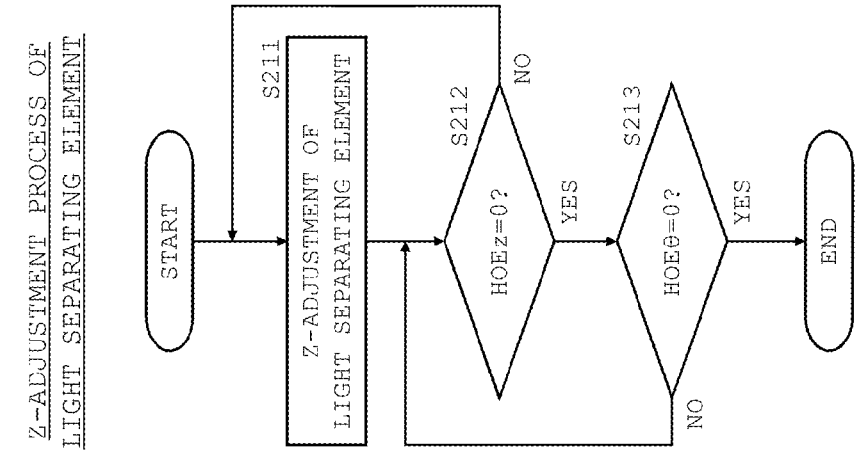
Figure 14D:
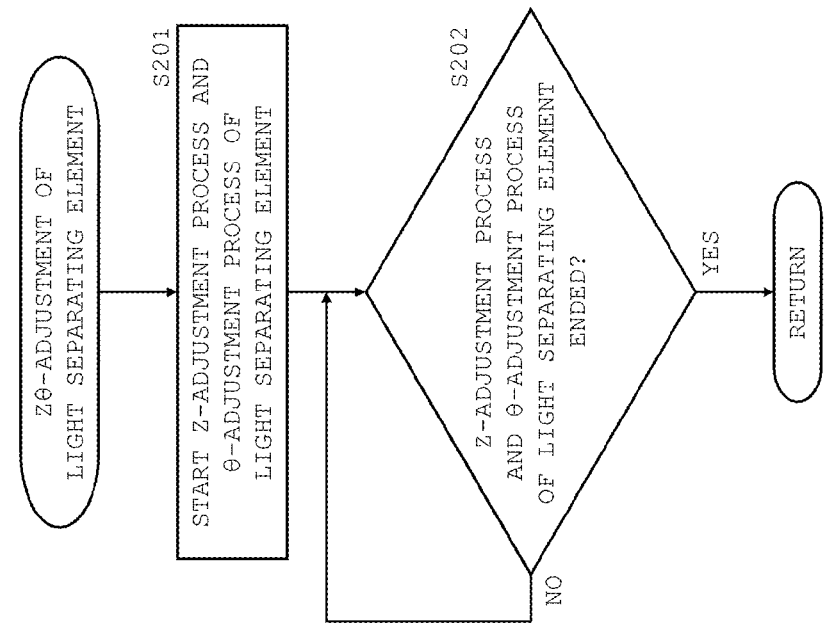

FIG. 14D is a flowchart showing the Zθ-adjustment of the light separating element H1, in the case where the Z-adjustment and the θ-adjustment of the light separating element H1 are carried out concurrently.

In the above arrangement, firstly, the Z-adjustment process of the light separating element H1 shown in FIG. 14E, and the θ-adjustment process shown in FIG. 14F are started concurrently (S201).

Referring to FIG. 14E, in the Z-adjustment process of the light separating element H1, firstly, the Z-adjustment of the light separating element H1 is carried out (S211), and it is judged whether HOEz=0 (S212). If it is not judged that HOEz=0 (S212:NO), the Z-adjustment of the light separating element H1 is carried out (S211), and if it is judged that HOEz=0 (S212:YES), then, it is judged whether HOEθ=0 (S213). Then, if it is not judged that HOEθ=0 (S213:NO), the process is returned to S212, and it is judged whether HOEz=0. If it is judged that HOEθ=0 (S213:YES), the Z-adjustment process of the light separating element H1 is ended.

Referring to FIG. 14F, in the θ-adjustment of the light separating element H1, firstly, the θ-adjustment of the light separating element H1 is carried out (S221), and it is judged whether HOEθ=0 (S222). If it is not judged that HOEθ=0 (S222:NO), then, the θ-adjustment of the light separating element H1 is carried out (S221). If it is judged that HOEθ=0 (S222:YES), then, it is judged whether HOEz=0 (S223). Then, if it is not judged that HOEz=0 (S223:NO), the process returns to S222, and then, it is judged whether HOEθ=0. If it is judged that HOEz=0 (S223:YES), the θ-adjustment process of the light separating element H1 is ended.

Referring back to FIG. 14D, in S202, the process waits until both of the Z-adjustment process of the light separating element H1 shown in FIG. 14E, and the θ-adjustment process of the light separating element H1 shown in FIG. 14F are ended (S202). If it is judged that both of the processes are ended (S202:YES), the Zθ-adjustment of the light separating element H1 is ended.

In S103 of FIG. 14B, S103 of FIG. 14C, S213 of FIGS. 14E and S223 of FIG. 14F, it is judged whether HOEz or HOEθ is set to zero. Alternatively, it is possible to judge whether HOEz or HOEθ lies in a range of a predetermined value approximate to zero, in other words, lies in a predetermined range where a positional displacement is allowed.

As described above, after the XY-adjustment and the Z-adjustment of the photodetector 116, and the XY-adjustment and the Zθ-adjustment of the light separating element H1 are completed, the light separating element H1 and the photodetector 116 are adhered to each other in the optical pickup device (S21). In this arrangement, an adhesive resin is coated on a portion of the light separating element H1 and the photodetector 116 to be adhered to each other, and ultraviolet light is irradiated onto the coated adhesive resin for adhering the light separating element H1 and the photodetector 116 to each other. Then, the automatic XY-adjustment control for the photodetector 116 is turned off (S22), and the arm for XY-adjustment, which is connected to the photodetector 116, is detached (chucking off) (S23).

As described above, plus first order diffraction light of BD light (signal light) passing through the light flux areas a11 through a14 shown in FIG. 10B is allowed to be properly entered into the sensing portions Ba1 through Ba4, Bs1 through Bs4 shown in FIG. 11. The optical axes of zero-th order diffraction light of BD light and zero-th order diffraction light of CD light to be entered into the photodetector 116 coincide with each other, and the four-divided sensors C1 through C3 for CD and the four-divided sensors D1 through D3 for DVD are disposed in advance on the light receiving surface of the photodetector 116. With this arrangement, performing the position adjustments of the light separating element H1 and the photodetector 116 based on BD light allows CD light and DVD light to be properly entered into the four-divided sensors C1 through C3, D1 through D3, as well as BD light.

Modification Examples

In the foregoing example, the light separating element H1 is used for distributing the irradiation area of BD light as shown in FIG. 6B. Alternatively, a light separating element H3 shown in FIG. 15A may be used, in place of the light separating element H1 in the foregoing example.

Figure 15B:
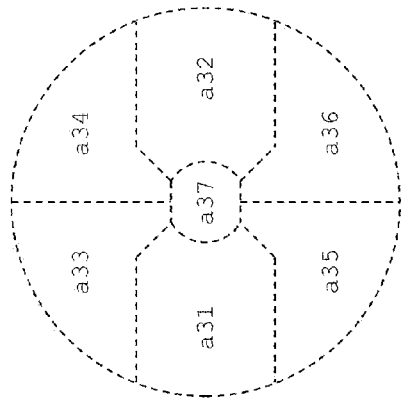
FIGS. 15A through 15C are diagrams for describing an arrangement of a light separating element as a modification of the example.
Figure 15C:
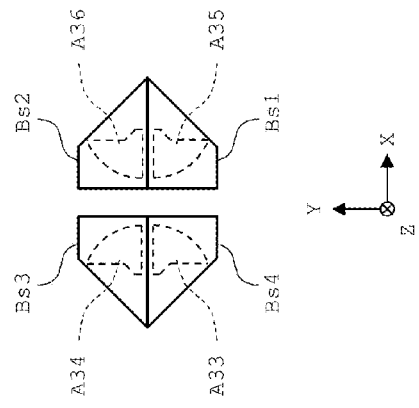
Figure 15A:
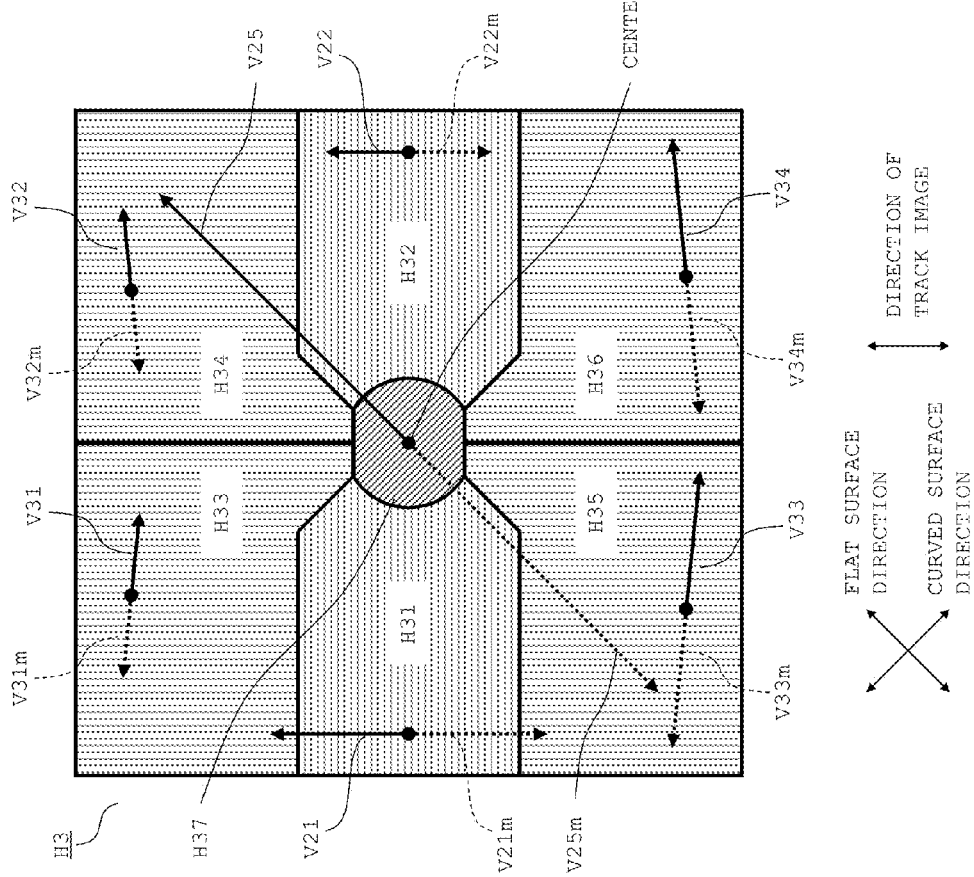

FIG. 15A is a plan view of the light separating element H3 when viewed from the side of the polarized beam splitter 106. FIG. 15B is a diagram showing light flux areas a31 through a37 obtained by dividing laser light to be entered into the light separating element H3 along borderlines of diffraction areas H31 through H37 of the light separating element H3.

The light separating element H3 is made of a square transparent plate, and has a two-step diffraction pattern on a light incident surface thereof, as well as the light separating element H1. As shown in FIG. 15A, the light incident surface of the light separating element H3 is divided into the seven diffraction areas H31 through H37. The diffraction areas H33, H34, the diffraction areas H35, H36 respectively have such shapes that each of the diffraction areas H13, H14 of the light separating element H1 shown in FIG. 10A is divided into left and right portions along a straight line extending in up and down directions and passing a center of the light separating element H3. The diffraction efficiencies and the pitches of the diffraction areas H31 through H37 are defined in the same manner as the diffraction efficiencies and the pitches of the corresponding diffraction areas of the light separating element H1.

The diffraction areas H31, H32, H37 impart vectors to the propagating directions of laser light passing through the light flux areas a31, a32, a37 in the same manner as the light separating element H1. The diffraction areas H33 through H36 respectively impart vectors V31 through V34, vectors V31m through V34m to the propagating directions of laser light passing through the light flux areas a33 through a36. The vectors V31 through V34 are vectors to be imparted to plus first order diffraction light, and the vectors V31m through V34m are vectors to be imparted to minus first order diffraction light. The vectors V31 and V32 are respectively vectors obtained by adding a downward vector component and an upward vector component to the vector V23 shown in FIG. 10A, and the vectors V33 and V34 are respectively vectors obtained by adding a downward vector component and an upward vector component to the vector V24 shown in FIG. 10A. The vectors V31m through V34m respectively have directions opposite to those of the vectors V31 through V34 and have magnitudes equal to those of the vectors V31 through V34.

FIG. 15C is a schematic diagram showing irradiation areas of plus first order diffraction light of BD light (signal light) located on the sensing portions Bs1 through Bs4 shown in FIG. 11. Since the irradiation areas on sensing portions other than the sensing portions Bs1 through Bs4 are substantially the same as those in the arrangement shown in FIG. 12, the description thereof is omitted herein.

As shown in FIG. 15C, plus first order diffraction light of BD light (signal light) passing through the light flux areas a33 through a36 is irradiated onto the irradiation areas A33 through A36. When the above operation is performed, the irradiation areas A33, A34 do not overlap the borderline between the sensing portion Bs3 and the sensing portion Bs4, and the irradiation areas A35, A36 do not overlap the borderline between the sensing portion Bs1 and the sensing portion Bs2. Specifically, allowing the vectors V31 through V34 to have a downward vector component or an upward vector component as described above enables to form a clearance between the irradiation areas A33 and A34, and enables to form a clearance between the irradiation areas A35 and A36. With this arrangement, it is possible to suppress degradation in precision of detection signals from the sensing portions Bs1 through Bs4, as compared with the arrangement of the light separating element H1, even in the case where the positions of the sensing portions Bs1 through Bs4 are displaced in up and down directions resulting from e.g. aging deterioration.

Regarding the light separating element H2 which has been described as a modification of the foregoing example referring to FIG. 13A, it is also possible to divide each of the upper diffraction area H23 and the lower diffraction area H24 into left and right portions, as shown in another modification example as described below.

Figure 16B:
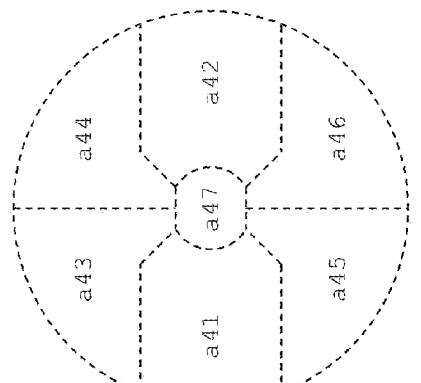
FIGS. 16A through 16C are diagrams for describing an arrangement of a light separating element as another modification of the example.
Figure 16C:
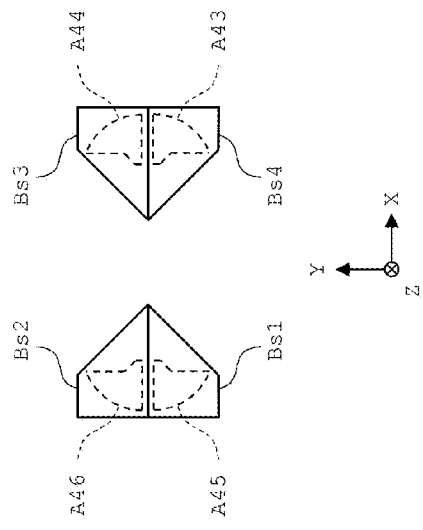
Figure 16A:
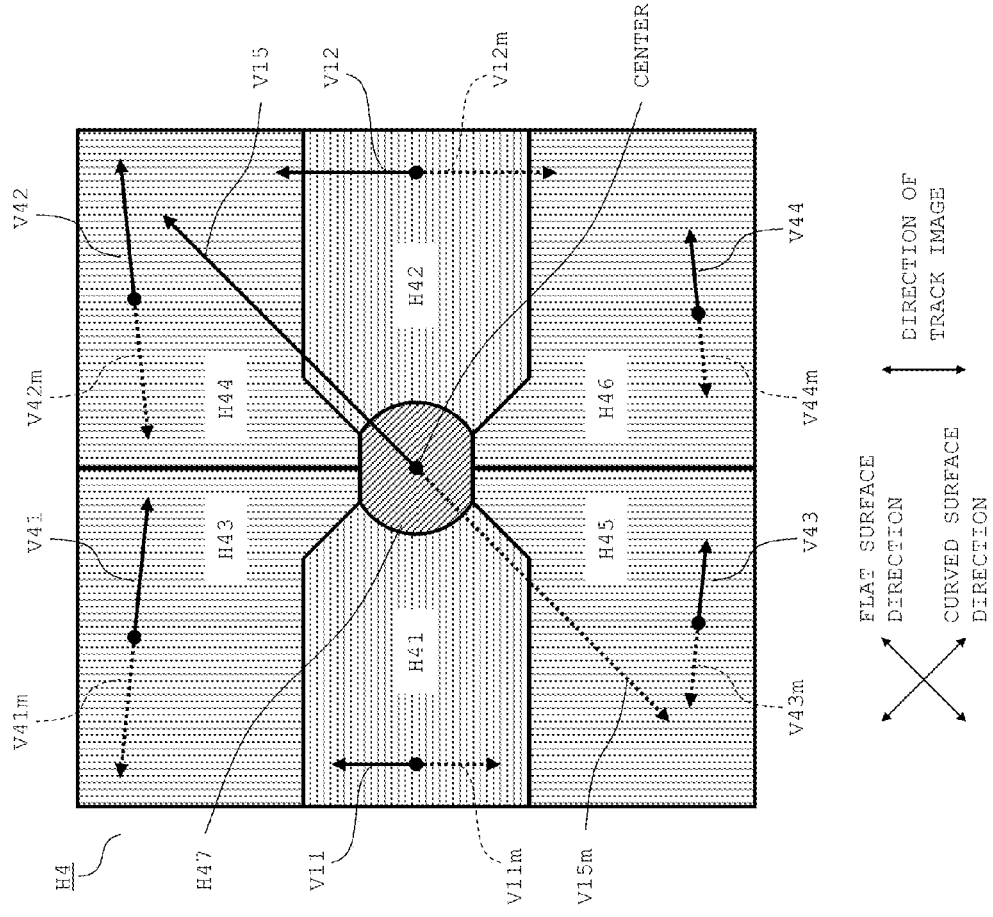

FIG. 16A is a plan view showing a light separating element H4 as another modification example.

Borderlines of diffraction areas H41 through H47 of the light separating element H4 are defined in the same manner as the diffraction areas H31 through H37 shown in FIG. 15A. Laser light passing through light flux areas a41 through a47 shown in FIG. 16B is respectively entered into the diffraction areas H41 through H47.

The diffraction areas H41, H42, H47 impart vectors to the propagating directions of laser light passing through the light flux areas a41, a42, a47 in the same manner as the light separating element H2. The diffraction areas H43 through H46 respectively impart vectors V41 through V44, vectors V41m through 44m to the propagating directions of laser light passing through the light flux areas a43 through a46. The vectors V41 through V44 are vectors to be imparted to plus first order diffraction light, and the vectors V41m through V44m are vectors to be imparted to minus first order diffraction light. The vectors V41, V42 are respectively vectors obtained by adding a downward vector component and an upward vector component to the vector V13 shown in FIG. 13A, and the vectors V43, V44 are respectively vectors obtained by adding a downward vector component and an upward vector component to the vector V14 shown in FIG. 13A. The vectors V41m through V44m respectively have directions opposite to those of the vectors V41 through V44 and have magnitudes equal to those of the vectors V41 through V44.

FIG. 16C is a schematic diagram showing irradiation areas of plus first order diffraction light of BD light (signal light) located on the sensing portions Bs1 through Bs4 shown in FIG. 13B.

As shown in FIG. 16C, plus first order diffraction light of BD light (signal light) passing through the light flux areas a43 through a46 is irradiated onto the irradiation areas A43 through A46. When the above operation is performed, there is formed a clearance between the irradiation areas A43 and A44, and a clearance between the irradiation areas A45 and A46 in the same manner as in the arrangement shown in FIG. 15C. With this arrangement, it is possible to suppress degradation in precision of detection signals from the sensing portions Bs1 through Bs4, as compared with the arrangement of the light separating element H2, even in the case where the positions of the sensing portions Bs1 through Bs4 are displaced in up and down directions resulting from e.g. aging deterioration.

Simulation of Stray Light at the Time of Lens Shift

The inventor of the present application conducted a simulation on an influence of stray light on the sensors disposed at the positions as shown in FIGS. 8A through 8C, in the case where plus first order diffraction light of BD light (signal light) is received on the sensors.

In the present simulation, there are proposed the following three light separating elements Hs1 through Hs3.

The light separating element Hs1 is a light separating element, wherein the vectors V01 through V04 shown in FIG. 4A are applied to the diffraction areas H31 through H36 shown in FIG. 15A. In this arrangement, the vectors in the diffraction areas H31, H32 respectively correspond to the vectors V01, V02 shown in FIG. 4A. Further, the vectors in the diffraction areas H33, H34 respectively correspond to vectors obtained by adding a downward vector component and an upward vector component to the vector V03 shown in FIG. 4A, and the vectors in the diffraction areas H35, H36 respectively correspond to vectors obtained by adding a downward vector component and an upward vector component to the vector V04 shown in FIG. 4A.

The light separating element Hs2 is a light separating element, wherein the vectors V11 through V14 shown in FIG. 5A are applied to the diffraction areas H31 through H36 shown in FIG. 15A. In this arrangement, the vectors in the diffraction areas H31, H32 respectively correspond to the vectors V11, V12 shown in FIG. 5A. Further, the vectors in the diffraction areas H33, H34 respectively correspond to vectors obtained by adding a downward vector component and an upward vector component to the vector V13 shown in FIG. 5A, and the vectors in the diffraction areas H35, H36 respectively correspond to vectors obtained by adding a downward vector component and an upward vector component to the vector V14 shown in FIG. 5A.

The light separating element Hs3 is configured in the same manner as the light separating element H3 shown in FIG. 15A. Specifically, the light separating element Hs3 is a light separating element, wherein the vectors V21 through V24 shown in FIG. 6A are applied to the diffraction areas H31 through H36 shown in FIG. 15A. In this arrangement, the vectors in the diffraction areas H31, H32 respectively correspond to the vectors V21, V22 shown in FIG. 6A. Further, the vectors in the diffraction areas H33, H34 respectively correspond to vectors obtained by adding a downward vector component and an upward vector component to the vector V23 shown in FIG. 6A, and the vectors in the diffraction areas H35, H36 respectively correspond to vectors obtained by adding a downward vector component and an upward vector component to the vector V24 shown in FIG. 6A.

Further, in the case where the light separating element Hs1 is used, the sensor shown in FIG. 8A is prepared, in the case where the light separating element Hs2 is used, the sensor shown in FIG. 8B is prepared, and in the case where the light separating element Hs3 is used, the sensor shown in FIG. 8C is prepared.

In any of the cases where the light separating elements Hs1 through Hs3 are used, as shown in FIG. 15C, the irradiation areas of signal light on the sensing portions located on the right side of the center O do not overlap the borderline between the sensing portions arranged in up and down directions.

Further, in the present simulation, BD has four recording layers, and the recording layers are arranged in the order of L3, L2, L1, L0 from the surface side (the light incident surface side) of BD. Further, a phenomenon that a BD objective lens (corresponding to the BD objective lens 114 in the foregoing example) is moved in a radial direction of BD, and the optical axis of the BD objective lens is shifted with respect to the optical axis of laser light is hereinafter called as a "lens shift".

Figure 17C:
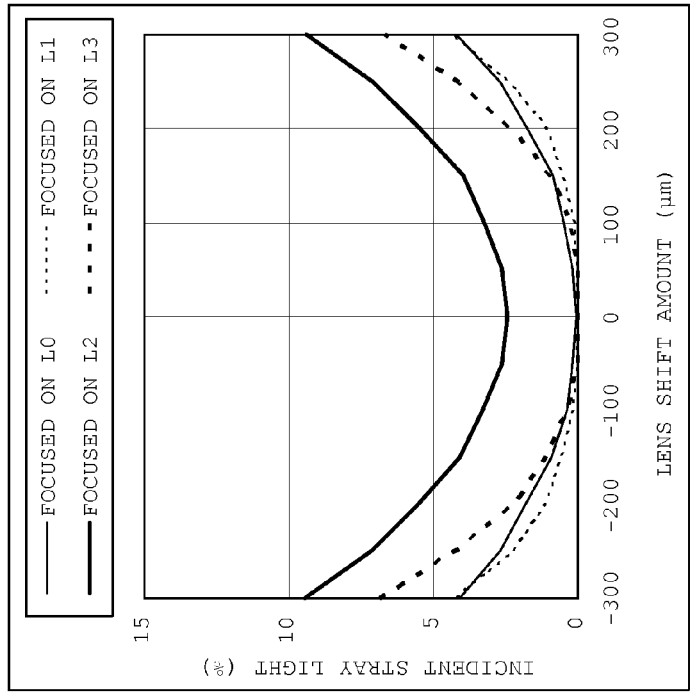
FIG. 17C is a diagram showing a simulation result on the relations between a lens shift amount and a ratio of stray light entered into the sensing portions, based on the technical principle in the embodiment.
Figure 17A:
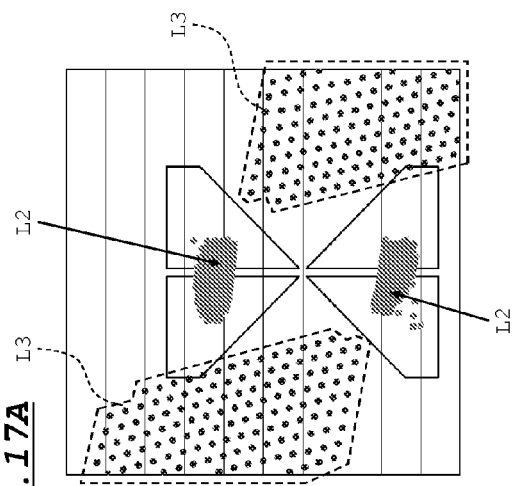
FIGS. 17A and 17B are diagrams showing a simulation result on irradiation areas near sensing portions.
Figure 17B:
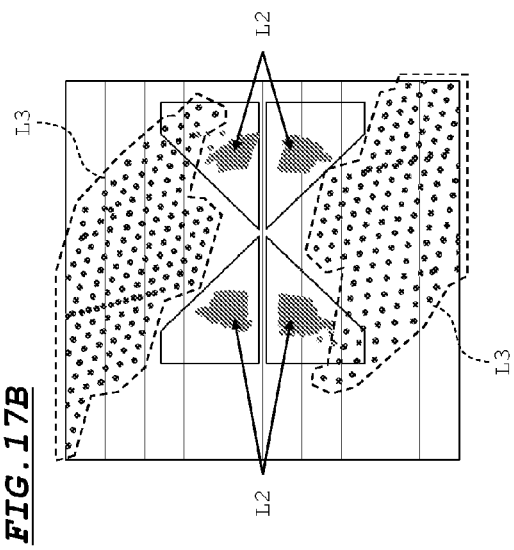

FIGS. 17A, 17B are diagrams showing a simulation result in the case where the light separating element Hs1 is used. FIGS. 17A, 17B respectively show distribution states of signal light and stray light near the upper-side sensing portions and the right-side sensing portions with respect to the center O. In this simulation, BD light is focused on the recording layer L2, and there is no lens shift. In FIGS. 17A, 17B, the reference sign "L2" denotes reflected light (signal light) from the recording layer L2, and the reference sign "L3" denotes reflected light (stray light) from the recording layer L3.

In the case where there is no less shift, as shown in FIG. 17A, signal light is properly irradiated onto the upper-side sensing portions, with no or less irradiation of stray light onto the upper-side sensing portions. On the other hand, as shown in FIG. 17B, although signal light is properly irradiated onto the right-side sensing portions, stray light is irradiated onto the right-side sensing portions with a large area, as compared with the state shown in FIG. 17A.

In this simulation, if there is a lens shift from the states shown in FIGS. 17A, 17B, stray light is shifted in left and right directions and is entered into both of the upper-side sensing portions and the right-side sensing portions with a large area. For instance, if stray light is shifted in a left direction, in the case of FIG. 17A, the right-side stray light from the recording layer L3 is entered into both of the upper right sensing portion and the lower right sensing portion. Further, in the case of FIG. 17B, although the lower-side stray light from the recording layer L3 is entered only into the lower left sensing portion, the upper-side stray light from the recording layer L3 is entered into both of the upper left sensing portion and the upper right sensing portion.

FIG. 17C is a diagram showing a simulation result on the relations between a lens shift amount and a ratio of stray light entered into sensing portions, in the case where the light separating element Hs1 is used. In FIG. 17C, the horizontal axis denotes a lens shift amount of the BD objective lens, and the vertical axis denotes a ratio of stray light to a total amount of light to be entered into the eight sensing portions shown in FIGS. 17A, 17B. FIG. 17C clearly shows that a large amount of stray light is entered into the sensing portions depending on the lens shift amount, in the case where the light separating element Hs1 is used, and detection signals from the sensing portions are degraded.

Figure 18A:
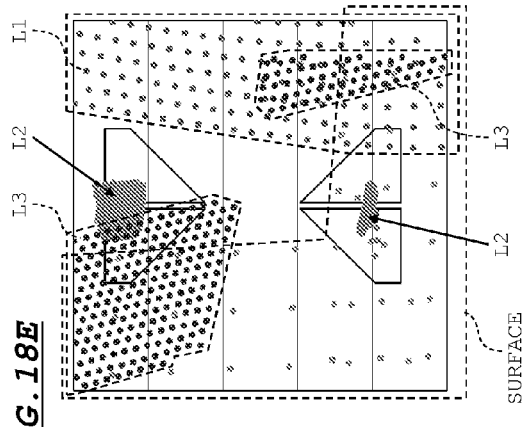
FIGS. 18A through 18F are diagrams showing a simulation result on irradiation areas near the sensing portions based on the technical principle in the embodiment.
Figure 18B:
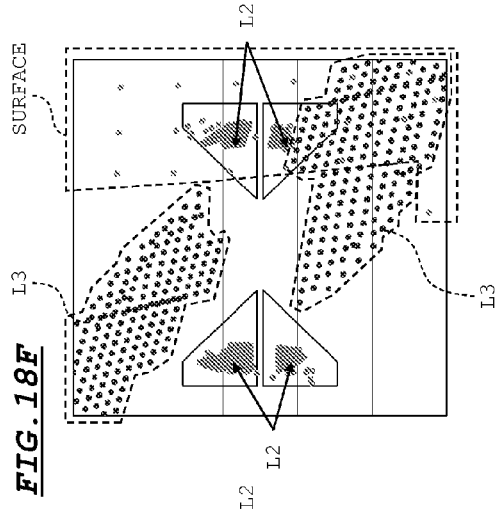
Figure 18C:
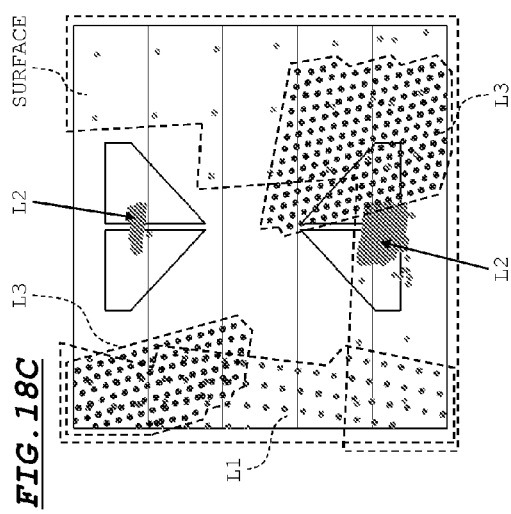
Figure 18D:
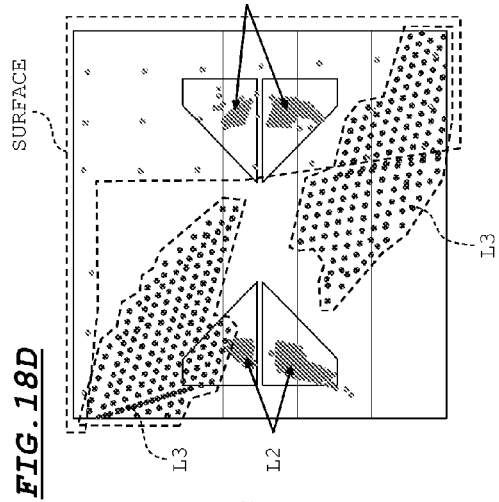
Figure 18E:
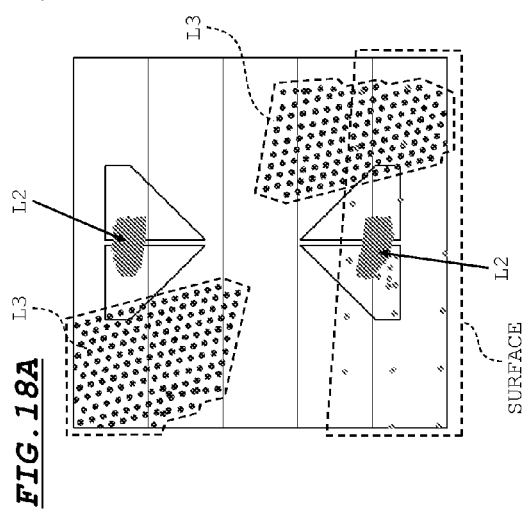
Figure 18F:
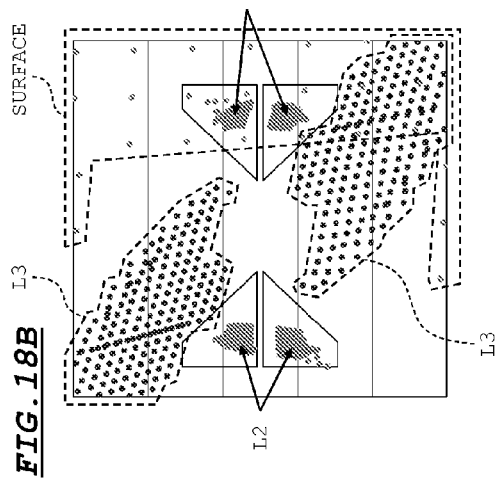

FIGS. 18A through 18F are diagrams showing a simulation result in the case where the light separating element Hs2 is used. FIGS. 18A, 18C and 18E show distribution states of signal light and stray light near the upper-side sensing portions with respect to the center O. FIGS. 18B, 18D and 18F show distribution states of signal light and stray light near the right-side sensing portions with respect to the center O. In this simulation, BD light is focused on the recording layer L2. In FIGS. 18A through 18F, the reference sign "L2" denotes reflected light (signal light) from the recording layer L2, the reference signs "L1", "L3" respectively denote reflected light (stray light) from the recording layers L1, L3, and the term "surface" denotes reflected light from the disc surface (light incident surface).

FIGS. 18A, 18B show cases that there is no less shift, FIGS. 18C, 18D show cases that stray light is shifted in a left direction resulting from a lens shift, and FIGS. 18E, 18F show cases that stray light is shifted in a right direction resulting from a lens shift.

As shown in FIG. 18A through 18F, signal light is properly irradiated onto the sensing portions regardless of presence of absence of a lens shift.

In the case where there is no lens shift, as shown in FIG. 18A, the irradiation area of stray light from the disc surface overlaps both of the lower left sensing portion and the lower right sensing portion of the upper-side sensing portions. However, since the irradiation area of stray light from the disc surface widely spreads, precision of detection signals from the sensing portions is maintained. Further, as shown in FIG. 18B, the irradiation area of stray light from the disc surface overlaps both of the upper right sensing portion and the lower right sensing portion. However, in this case also, since the irradiation area of stray light from the disc surface widely spreads as well as the case shown in FIG. 18A, precision of detection signals from the sensing portions is maintained.

In the case where stray light is shifted in a left direction resulting from a lens shift, as shown in FIG. 18C, the irradiation area of stray light from the recording layer L3 overlaps the lower right sensing portion of the upper-side sensing portions. However, in this case, since the irradiation area of stray light from the recording layer L3 overlaps only the lower right sensing portion, the irradiation area of stray light which may overlap a sensing portion can be reduced, as compared with the case where the irradiation area of stray light from the recording layer L3 shown in FIG. 17A is shifted in a left direction. Further, as shown in FIG. 18D, although the upper-side irradiation area of stray light from the recording layer L3 overlaps the upper left sensing portion of the right-side sensing portions, the lower-side irradiation area of stray light from the recording layer L3 does not overlap any of the sensing portions of the right-side sensing portions. Since stray light from the disc surface widely spreads in both of the cases shown in FIGS. 18C and 18D, precision of detection signals from the sensing portions is maintained, as well as the cases shown in FIGS. 18A, 18B.

In the case where stray light is shifted in a right direction resulting from a lens shift, as shown in FIGS. 18E, 18F, the irradiation area of stray light which may overlap the sensing portions is small, as well as the cases shown in FIGS. 18C, 18D. In this case, as shown in FIG. 18E, the irradiation area of stray light from the recording layer L1 overlaps a lower right sensing portion of the upper-side sensing portions.

Figure 20A:
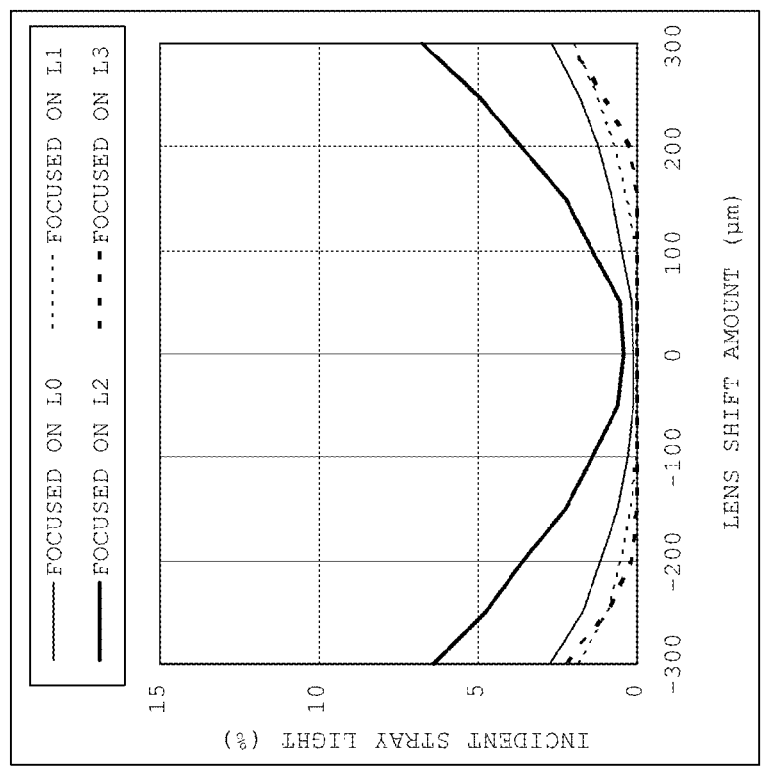
FIGS. 20A and 20B are diagrams showing a simulation result on the relations between a lens shift amount and a ratio of stray light entered into the sensing portions based on the technical principle in the embodiment.

FIG. 20A is a diagram showing a simulation result on the relations between a lens shift amount and a ratio of stray light entered into sensing portions, in the case where the light separating element Hs2 is used. FIG. 20A clearly shows that the ratio of stray light entered into the sensing portions is small, as compared with the case shown in FIG. 17C. In other words, use of the light separating element Hs2 is more advantageous in reducing the ratio of stray light which may enter into the sensing portions, as compared with the case of using the light separating element Hs1.

FIGS. 19A through 19F are diagrams showing a simulation result in the case where the light separating element Hs3 is used. FIGS. 19A through 19F show distribution states of signal light and stray light near the upper-side sensing portions and the right-side sensing portions with respect to the center O. In this simulation, BD light is also focused on the recording layer L2. In FIGS. 19A through 19F, the reference sign "L2" denotes reflected light (signal light) from the recording layer L2, the reference signs "L1", "L3" respectively denote reflected light (stray light) from the recording layers L1, L3, and the term "surface" denotes reflected light from the disc surface (light incident surface).

Figure 19A:
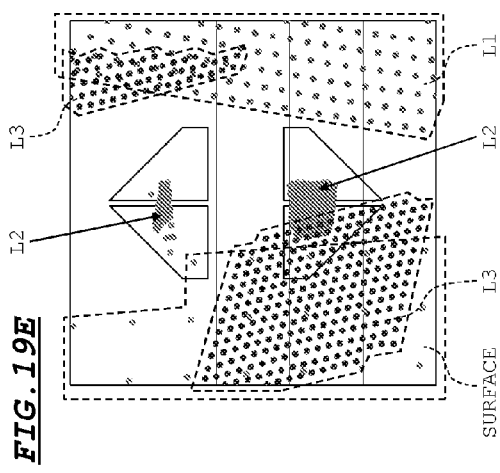
FIGS. 19A through 19F are diagram showing a simulation result on irradiation areas near the sensing portions based on the technical principle in the embodiment.
Figure 19C:
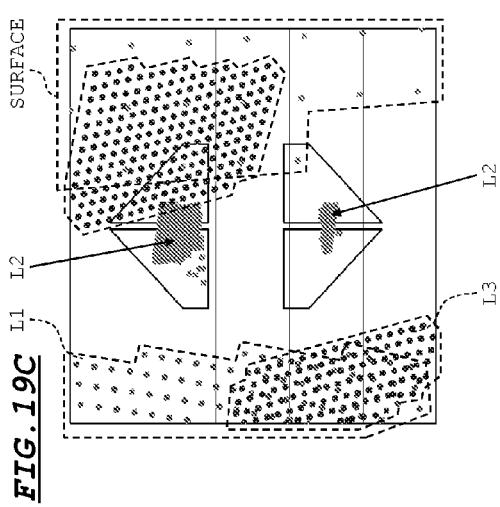
Figure 19E:
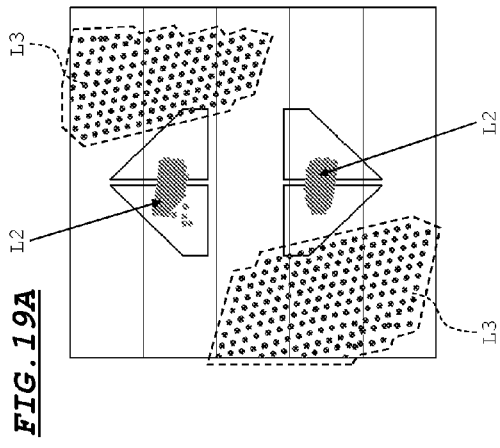
Figure 19B:
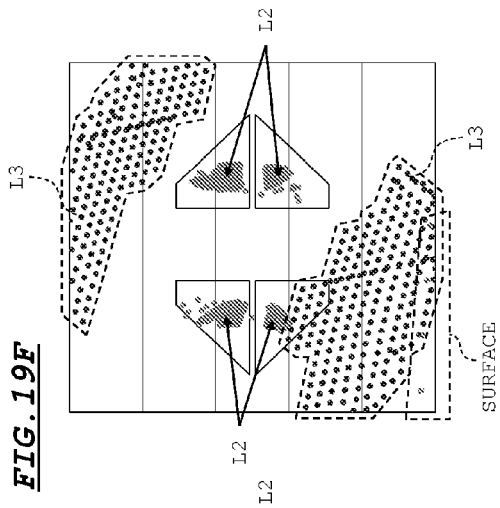

In the case where there is no lens shift, as shown in FIGS. 19A, 19B, the irradiation area of stray light from the disc surface does not overlap the sensing portions, unlike the cases shown in FIGS. 18A, 18B.

Figure 19D:
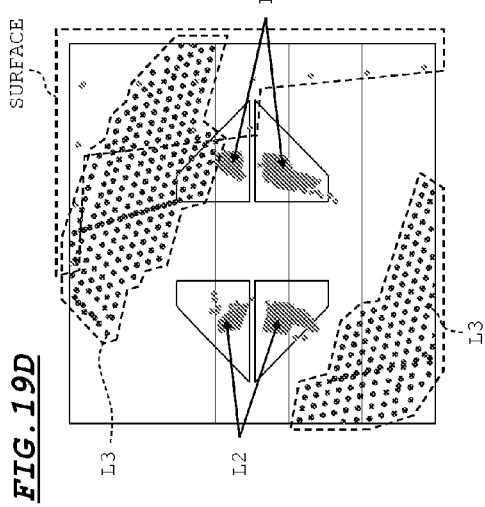

In the case where stray light is shifted in a left direction resulting from a lens shift, as shown in FIGS. 19C, 19D, the area of an overlapped portion between the irradiation area of stray light from the disc surface and the sensing portions is small, as compared with the cases shown in FIGS. 18C, 19D. Further, as shown in FIG. 19D, the area of an overlapped portion between the upper-side irradiation area of stray light from the recording layer L3 and the right-side sensing portions is small, as compared with the case shown in FIG. 18D.

Figure 19F:
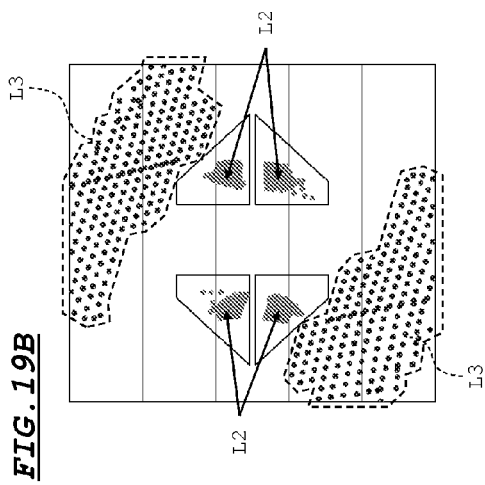

In the case where the irradiation area of stray light resulting from a lens shift is shifted in a right direction, as shown in FIGS. 19E, 19F, the area of an overlapped portion between the irradiation area of stray light from the disc surface and the sensing portions is small, as compared with the cases shown in FIGS. 18E, 18F. Further, as shown in FIG. 19E, the irradiation area of stray light from the recording layer L1 does not overlap the upper-side sensing portions, unlike the case shown in FIG. 18E.

Figure 20B:
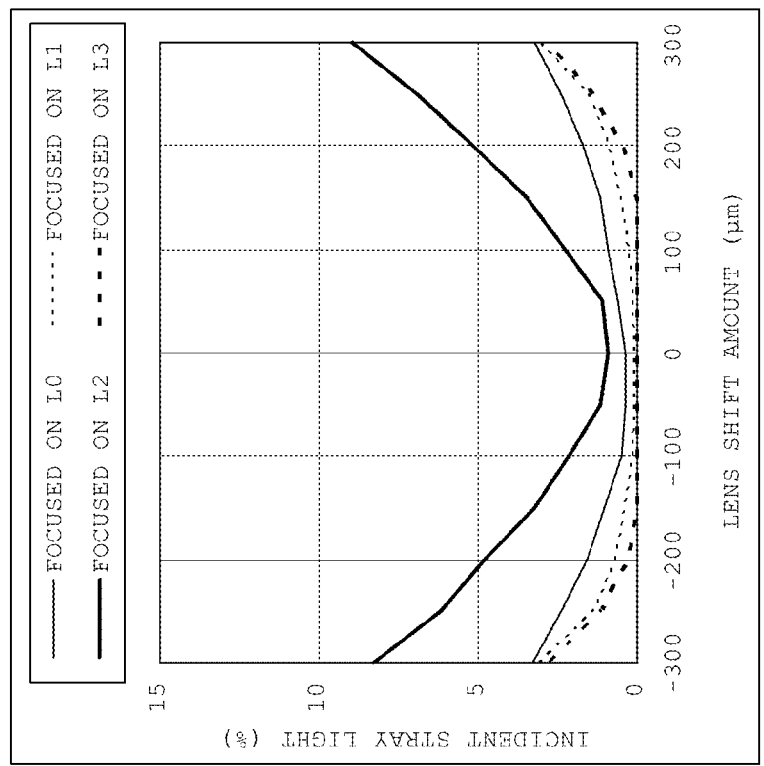

FIG. 20B is a diagram showing a simulation result on the relations between a lens shift amount and a ratio of stray light entered into sensing portions, in the case where the light separating element Hs3 is used. FIG. 20B clearly shows that the ratio of stray light entered into the sensing portions is small, as compared with the case shown in FIG. 20A. In other words, use of the light separating element Hs3 is more advantageous in reducing the ratio of stray light which may enter into the sensing portions, as compared with the case of using the light separating element Hs2.

The example of the invention has been described as above. The invention is not limited to the foregoing example, and the example of the invention may be modified in various ways other than the above.

For instance, in the foregoing example, the light separating element H1 is disposed at a position anterior to the anamorphic lens 115. Alternatively, the light separating element H1 may be disposed at a position posterior to the anamorphic lens 115. Further alternatively, a diffraction pattern for imparting substantially the same diffraction function as the light separating element H1 to laser light may be integrally formed on the light incident surface or the light output surface of the anamorphic lens 115.

It is desirable to dispose the light separating element H1 at a position anterior to the anamorphic lens 115, rather than disposing the light separating element H1 at a position posterior to the anamorphic lens 115. Specifically, disposing the light separating element H1 at a position anterior to the anamorphic lens 115 makes it possible to lengthen the distance from the light separating element H1 to the photodetector 116, as compared with the case where the light separating element H1 is disposed at a position posterior to the anamorphic lens 115. With this arrangement, as shown in FIG. 11, it is possible to irradiate plus first order diffraction light of BD light (signal light), on the photodetector 116, at a position sufficiently away from the center O, without the need of setting the diffraction angle of the light separating element H1 to a large value.

Further, in the foregoing example, as shown in FIG. 11, the four-divided sensors C1 through C3 are disposed in up and down directions for acquiring a tracking error signal for CD based on an in-line method. In the case where the four-divided sensors C1 through C3 are disposed in the manner as described above, the direction of a vector to be given by the diffraction area H15 may be changed in up and down directions so that plus first order diffraction light and minus first order diffraction light of BD light diffracted by the diffraction area H15 are irradiated onto the four-divided sensors C2, C3.

FIG. 21A is a plan view showing a light separating element H1 configured in such a manner that the direction of the vector to be given by the diffraction area H15 is changed in up and down directions. In this arrangement, the diffraction area H15 imparts vectors V45, V45$m$ to plus first order diffraction light and to minus first order diffraction light of BD light passing through the light flux area a15. The directions of the vectors V45, V45$m$ are in parallel to the direction of a track image, and the magnitudes of the vectors V45, V45$m$ are equal to each other.

In this arrangement, the magnitudes of the vectors V45, V45$m$ are adjusted in such a manner that the irradiation area for the four-divided sensor Bz shown in FIG. 12, and a irradiation area located symmetrical to the aforementioned irradiation area with respect to the center O are respectively located at the four-divided sensors C2, C3. In this arrangement, the four-divided sensor Bz shown in FIG. 12 is omitted.

FIG. 21B is a diagram showing a distribution state of BD light (signal light) near the center O of the photodetector 116 in the above arrangement. The four-divided sensors C2, C3 are disposed at positions symmetrical to each other with respect to the four-divided sensor C1 in the same manner as in the foregoing example.

As shown in FIG. 21B, zero-th order diffraction light of BD light (signal light) to be entered into all the diffraction areas H11 through H15 is irradiated at the center O. Plus first order diffraction light of BD light (signal light) diffracted by the diffraction area H15 is irradiated onto a central part of the four-divided sensor C2. Minus first order diffraction light of BD light (signal light) diffracted by the diffraction area H15 is irradiated onto a central part of the four-divided sensor C3.

In the above arrangement, assuming that detection signals from the sensing portions C21 through C24, C31 through C34 are respectively expressed as C21 through C24, C31 through C34, HOEz, HOEθ can be acquired by the following equations (12), (13), in place of HOEz, HOEθ to be used in the Z-adjustment and the θ-adjustment of the light separating element H1 expressed by the equations (10), (11).

$$\mathrm{HOE}z = \{\{(C21+C24)-(C22+C23)\}+\{(C32+C33)-(C31+C34)\}\}/\{(C21+C22+C23+C24)+(C31+C32+C33+C34)\} \qquad (12)$$

$$\mathrm{HOE}\theta = \{\{(C21+C22)-(C23+C24)\}+\{(C33+C34)-(C31+C32)\}\}/\{(C21+C22+C23+C24)+(C31+C32+C33+C34)\} \qquad (13)$$

The light separating element H1 is positioned at such a position that the value of HOEz expressed by the equation (12) is set to zero in Z-axis direction, and is positioned at such a position that the value of HOEθ expressed by the equation

(13) is set to zero in a rotating direction with respect to the center O. Specifically, the adjustment of Step S20 in FIG. 14 is performed based on the equations (12), (13). By performing the above operation, it is possible to properly set the position of the light separating element H1 in Z-axis direction and in a rotating direction with respect to the center O.

In this example, there is a case that the four-divided sensors C2, C3 are disposed at positions slightly displaced in left and right directions with respect to the respective positions shown in FIG. 21B for realizing a tracking adjustment technology by an in-line method.

Figure 22A:
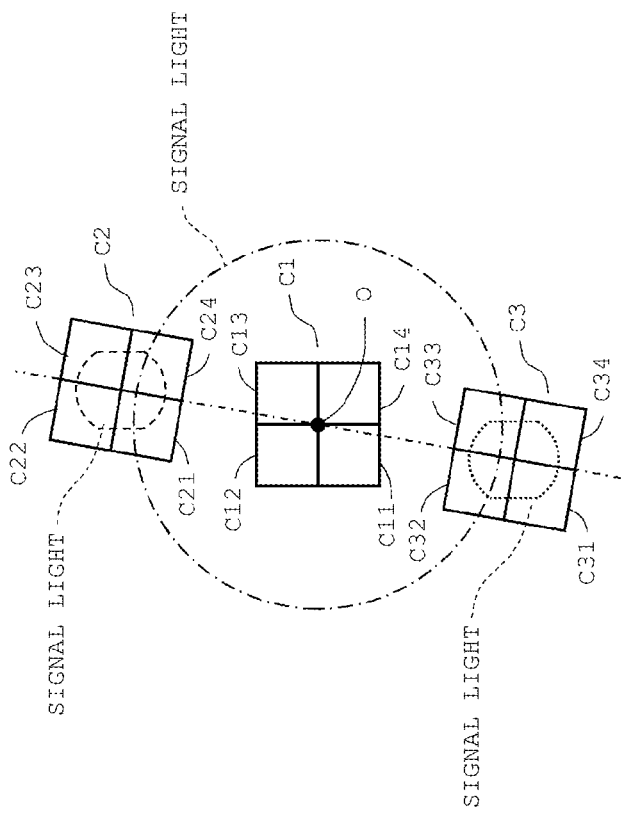
FIGS. 22A and 22B are diagrams showing the portion near the center of the photodetector as the modification of the example.

FIG. 22A is a diagram showing a distribution state of BD light (signal light) near the center O of the photodetector 116 in the above arrangement. In FIG. 22A, as compared with the arrangement shown in FIG. 21B, the four-divided sensors C2, C3 are respectively and slightly displaced in a right direction and in a left direction, and the four-divided sensors D2, D3 are respectively and slightly displaced in a right direction and in a left direction. In the above arrangement, as shown in FIG. 22A, at the time of position adjustment, the vectors in the diffraction area H15 are defined in such a manner that plus first order diffraction light and minus first order diffraction light of BD light (signal light) are respectively irradiated onto the four-divided sensors C2, C3.

In the above arrangement, the parting lines of the four-divided sensors C1 through C3 are not located on one straight line passing the center O. Accordingly, disposing the four-divided sensors C1 through C3 as described above may result in inclusion of a slight error in HOEz, HOEθ expressed by the equations (12), (13), as compared with the arrangement shown in FIG. 21B. If, however, displacement amounts of the four-divided sensors C2, C3 in left and right directions are small, the amount of error is small. Accordingly, it is possible to adjust the position of the light separating element H1 within a range having a small amount of error.

As described above, the wording of claim 4, 8 "one of two parting lines of the first four-divided sensor, and one of two parting lines of the second four-divided sensor are oriented in a direction toward a reference point at which the optical axis of the laser light reflected on the recording medium intersects the light receiving surface of the photodetector" includes the arrangement that the four-divided sensors C2, C3 are slightly displaced in left and right directions. Specifically, as far as the parting lines of the four-divided sensors C2, C3 are substantially oriented in a direction toward the center O, the wording of claim 3 also includes an arrangement that the parting lines of the four-divided sensors C2, C3 are slightly inclined from a straight light connecting between the center O and the centers of the four-divided sensors C2, C3. The aforementioned idea is also applied to the relation between the center O shown in FIGS. 11, 13B and a parting line of the four-divided sensor Bz.

In the case where the optical pickup device is configured to be compatible only with BD, in place of the foregoing example in which the optical pickup device is configured to be compatible with BD, DVD and CD, the four-divided sensors C2, C3 are disposed around the center O for position adjustment as follows.

Figure 22B:
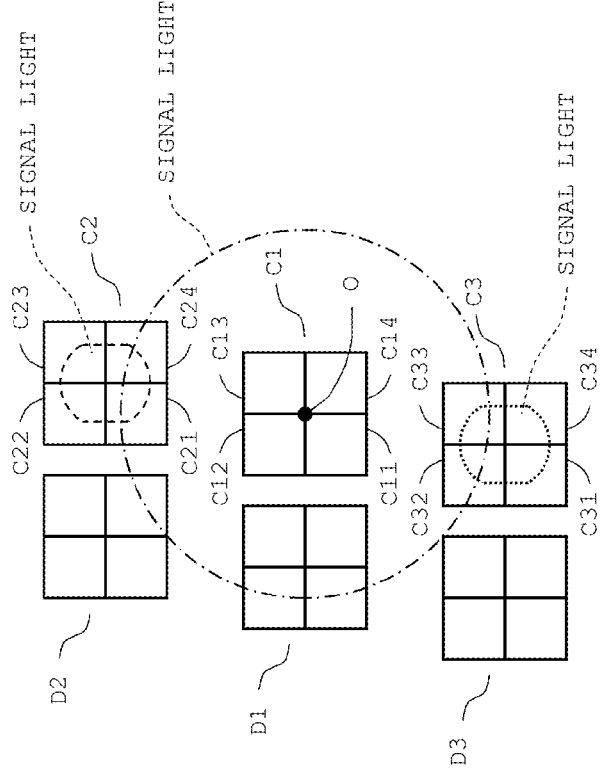

FIG. 22B is a diagram showing a state that the four-divided sensors C2, C3 are disposed at certain positions by rotating the four-divided sensors C2, C3 around the center O from the state shown in FIG. 21B. In the case where the parting lines of the four-divided sensors C2, C3 are located on one straight line passing the center O, and the four-divided sensors C2, C3 are located symmetrical to each other with respect to the center O as shown in FIG. 22B, it is possible to adjust the position of the light separating element H1, based on HOEz, HOEθ without an error in the same manner as in the arrangement shown in FIG. 21B.

Further, in the foregoing example, there is exemplified an optical pickup device compatible with BD, CD and DVD. Alternatively, the invention may be applied to an optical pickup device compatible with BD and DVD, an optical pickup device compatible only with BD, or the like. For instance, in the case where the invention is applied to an optical pickup device compatible only with BD, the optical systems for CD and DVD are omitted from the optical system shown in FIGS. 9A, 9B. In the above modification, the four-divided sensors C2, C3, D1 through D3 are omitted from the sensor layout shown in FIG. 11.

Further, in the foregoing example, each of the diffraction areas H13, H14 of the light separating element H1 is divided into the diffraction areas H33, H34 and the diffraction areas H35, H36 shown in FIG. 15A, and the diffraction direction of each of the diffraction areas obtained by the division is adjusted in a slightly downward direction or in a slightly upward direction. Similarly to the above, each of the diffraction areas H31 and H32 shown in FIG. 15A may be divided into an upper portion and a lower portion, and the diffraction direction of each of the diffraction areas obtained by the division may be adjusted in a slightly rightward direction or in a slightly leftward direction for suppressing incidence of signal light onto the borderline between the sensing portions Ba1 and Ba4, and the borderline between the sensing portions Ba2 and Ba3.

Furthermore, in the foregoing example, the vectors in the diffraction areas are defined as shown in FIGS. 10A, 13A. Alternatively, the vectors in the diffraction areas may be defined as shown in FIG. 23A.

Figure 23B:
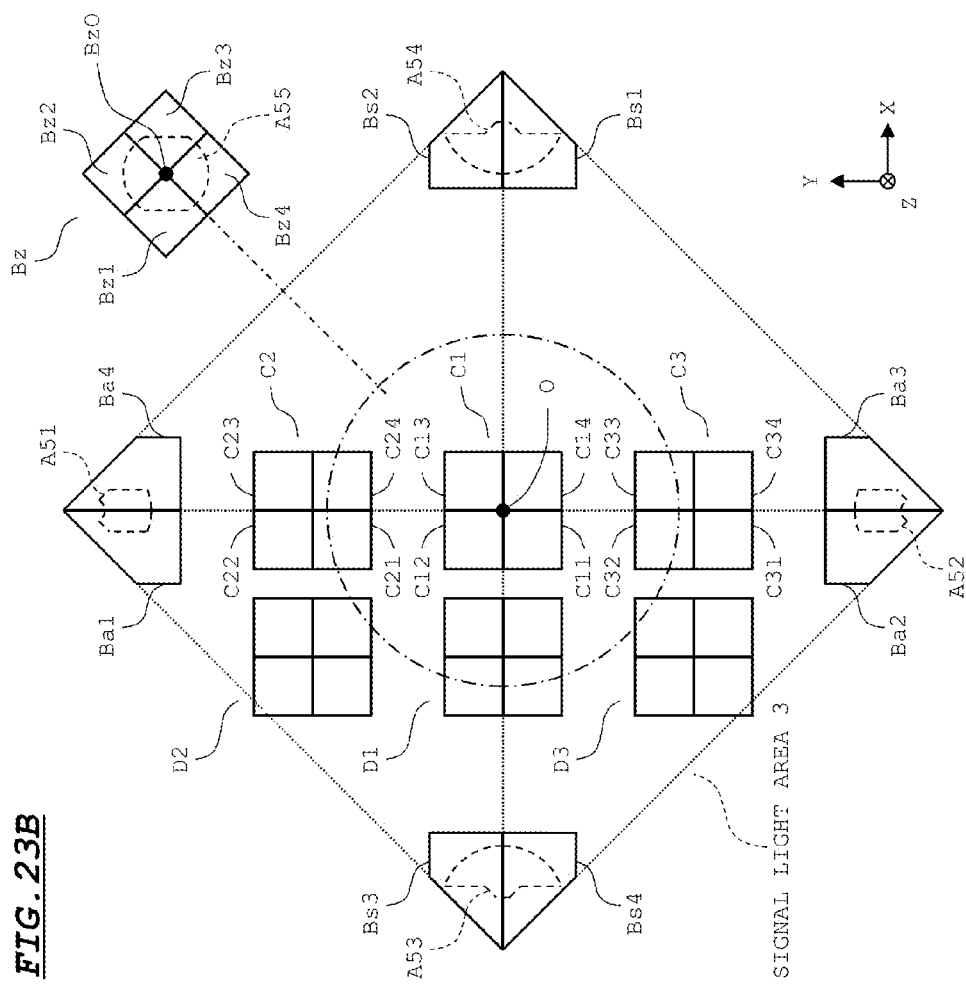
FIG. 23A is a plan view showing a light separating element and FIG. 23B is a diagram showing a sensor layout of a photodetector as another modification of the example.
Figure 23A:
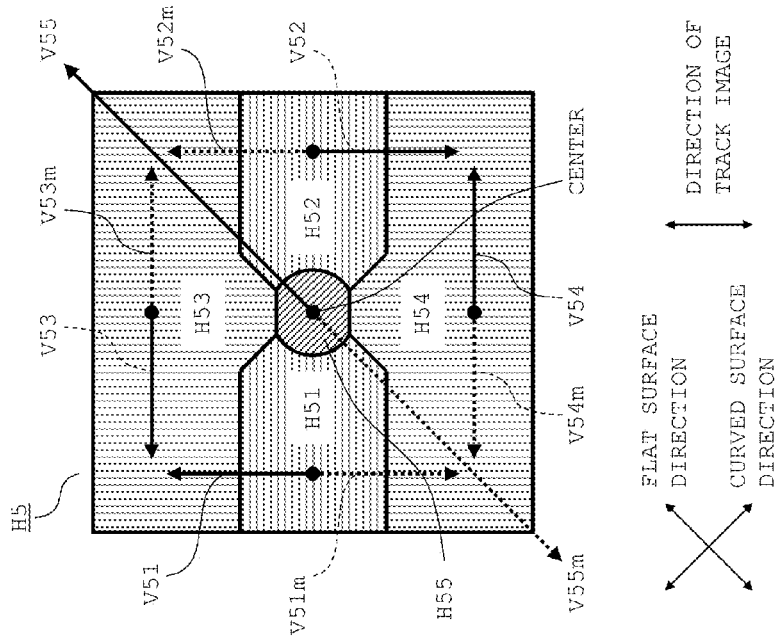

FIG. 23A is a plan view showing a light separating element H5 in the above arrangement.

Diffraction areas H51 through H55 of the light separating element H5 are configured in such a manner that vectors V51 through V55 are imparted to plus first order diffraction light and vectors V51m through V55m are imparted to minus first order diffraction light. The directions of the vectors V51 through V54 are inclined by 45 degrees with respect to the flat surface direction and with respect to the curved surface direction, and differ from each other. The magnitudes of the vectors V51 through V54 are equal to each other. The vectors V51m through V55m respectively have directions opposite to those of the vectors V51 through V55, and have magnitudes equal to those of the vectors V51 through V55. The directions of the vectors V55 and V55m are respectively the same as those of the vectors V25 and V25m shown in FIG. 10A.

FIG. 23B is a diagram showing a sensor layout of a photodetector 116, in the case where the light separating element H5 is used.

In the above arrangement, the sensing portions Ba1, Ba4 and the sensing portions Ba2, Ba3 are respectively disposed at an upper side position and at a lower side position with respect to the center O, and the sensing portions Bs1, Bs2 and the sensing portions Bs3, Bs4 are respectively disposed at a right side position and at a left side position with respect to the center O. Further, the four-divided sensor Bz is disposed at such a position that a straight line connecting between the center O and the center BzO of the four-divided sensor Bz is aligned with one of the parting lines of the four-divided sensor Bz in the same manner as in the embodiment.

Plus first order diffraction light of BD light (signal light) to be entered into the diffraction areas H51 through H55 are irradiated onto irradiation areas A51 through A55. Zero-th order diffraction light of BD light (signal light) to be entered into all the diffraction areas H51 through H55 is irradiated at the center O. The magnitudes of the vectors V51 through V55 in the diffraction areas H51 through H55 are defined in such a manner that the irradiation areas are distributed as shown in FIG. 23B.

Plus first order diffraction light of BD light (stray light 1, 2) and minus first order diffraction light of BD light (stray light 1, 2) entered into the diffraction areas H51 through H54 are irradiated to the outside of a signal light area 3 to be defined by the vertex angles of the sensing portions Ba1 through Ba4, Bs1 through Bs4. Minus first order diffraction light of BD light (signal light) to be entered into the diffraction area H55 is irradiated at a lower left position with respect to the center O.

In the above arrangement, it is also possible to receive only plus first order diffraction light of BD light (signal light) by the sensing portions Ba1 through Ba4, Bs1 through Bs4 in the same manner as in the foregoing example. Further, it is possible to adjust the positions of the light separating element H5 and the photodetector 116, based on detection signals from the four-divided sensors Bz, C1 in the same manner as in the foregoing example.

Further, in the foregoing example, as shown in FIG. 12, the four-divided sensor Bz is disposed with an inclination of 45 degrees with respect to up and down directions and with respect to left and right directions. Alternatively, as far as the parting line of the four-divided sensor Bz is substantially aligned with the one-dotted chain line connecting between the center O and the center BzO of the four-divided sensor Bz, it is possible to dispose the four-divided sensor Bz with an inclination of any degree with respect to up and down directions and with respect to left and right directions. In the modification, the vector in a central diffraction area (e.g. the diffraction area H15) of the light separating element is defined in accordance with the inclination of the four-divided sensor Bz.

The invention is preferably applied to an arrangement that a light separating element has a step-type diffraction pattern, as described in the foregoing example. Alternatively, the invention may also be applied to an arrangement that a light separating element has a blazed diffraction pattern. Specifically, the invention may also be applied to a case where only one of plus first order diffraction light and minus first order diffraction light is generated, in addition to the case where both of plus first order diffraction light and minus first order diffraction light are generated.

Furthermore, the diffraction directions of laser light by the light separating element are not limited to the ones described in the foregoing example. As far as it is possible to separate, when an intersection of two straight lines extending in parallel to the flat surface direction and the curved surface direction and intersecting with each other is aligned with the optical axis of laser light, laser light in two light flux areas in the direction of one pair of vertically opposite angles, laser light in other two light flux areas in the direction of another pair of vertically opposite angles, and laser light in a light flux area at the intersection of the two straight lines, one from the other, on the light receiving surface of the photodetector, the diffraction directions of laser light by the light separating element may be set in any direction other than the directions shown in the foregoing example.

The embodiment of the invention may be changed or modified in various ways as necessary, as far as such changes and modifications do not depart from the scope of the claims of the invention hereinafter defined.

What is claimed is:
1. An optical pickup device, comprising:
a laser light source;
an objective lens which focuses laser light emitted from the laser light source on a recording medium;
an astigmatism element into which the laser light reflected on the recording medium is entered, and which converges the laser light in a first direction for generating a first focal line and converges the laser light in a second direction perpendicular to the first direction for generating a second focal line;
a photodetector which receives the laser light passing through the astigmatism element; and
a light separating element into which the laser light reflected on the recording medium is entered, and which guides the laser light entered into two first areas and into two second areas at four respective positions different from each other, on a light receiving surface of the photodetector, and which guides the laser light entered into a third area to a position different from the four positions, on the light receiving surface of the photodetector, wherein
the photodetector has a plurality of sensing portions disposed at the four positions to which the laser light entered into the two first areas and into the two second areas is guided, and has a four-divided sensor disposed at the position to which the laser light entered into the third area is guided,
when an intersection of two straight lines extending in parallel to the first direction and the second direction and intersecting with each other is aligned with an optical axis of the laser light, the two first areas are disposed in a direction along which one pair of vertically opposite angles defined by the two straight lines are aligned, and the two second areas are disposed in a direction along which another pair of vertically opposite angles are aligned,
the third area is disposed at the intersection of the two straight lines, and
the four-divided sensor is disposed at such a position that one of two parting lines of the four-divided sensor is oriented in a direction toward a reference point at which the optical axis of the laser light reflected on the recording medium intersects the light receiving surface of the photodetector.
2. The optical pickup device according to claim 1, wherein the light separating element imparts a light separating function to the laser light to be entered into the two first areas in directions identical to each other and with magnitudes different from each other, and imparts a light separating function to the laser light to be entered into the two second areas in directions identical to each other and with magnitudes different from each other.
3. The optical pickup device according to claim 1, wherein the light separating element has a step-type diffraction pattern operable to separate the laser light by diffraction, and
the photodetector has an another four-divided sensor which receives the laser light transmitted through the light separating element without being diffracted on the diffraction pattern.
4. An optical pickup device, comprising:
a laser light source;
an objective lens which focuses laser light emitted from the laser light source on a recording medium;
an astigmatism element into which the laser light reflected on the recording medium is entered, and which con- verges the laser light in a first direction for generating a first focal line and converges the laser light in a second direction perpendicular to the first direction for generating a second focal line;

a photodetector which receives the laser light passing through the astigmatism element; and a light separating element into which the laser light reflected on the recording medium is entered, and which guides the laser light entered into two first areas and into two second areas at four respective positions different from each other, on a light receiving surface of the photodetector, and which guides the laser light entered into a third area to two positions different from the four positions, on the light receiving surface of the photodetector, wherein the photodetector has a plurality of sensing portions disposed at the four positions to which the laser light entered into the two first areas and into the two second areas is guided, and has a first four-divided sensor and a second four-divided sensor disposed at the two respective positions to which the laser light entered into the third area is guided, when an intersection of two straight lines extending in parallel to the first direction and the second direction and intersecting with each other is aligned with an optical axis of the laser light, the two first areas are disposed in a direction along which one pair of vertically opposite angles defined by the two straight lines are aligned, and the two second areas are disposed in a direction along which another pair of vertically opposite angles are aligned, the third area is disposed at the intersection of the two straight lines, and the first four-divided sensor and the second four-divided sensor are disposed at such positions that one of two parting lines of the first four-divided sensor, and one of two parting lines of the second four-divided sensor are oriented in a direction toward a reference point at which the optical axis of the laser light reflected on the recording medium intersects the light receiving surface of the photodetector.

5. The optical pickup device according to claim 4, wherein the light separating element imparts a light separating function to the laser light to be entered into the two first areas in directions identical to each other and with magnitudes different from each other, and imparts a light separating function to the laser light to be entered into the two second areas in directions identical to each other and with magnitudes different from each other.

6. The optical pickup device according to claim 4, wherein the light separating element has a step-type diffraction pattern operable to separate the laser light by diffraction, and the photodetector has a third four-divided sensor which receives the laser light transmitted through the light separating element without being diffracted on the diffraction pattern.

7. A position adjusting method for a light separating element in an optical pickup device, the optical pickup device being provided with:

a laser light source;

an objective lens which focuses laser light emitted from the laser light source on a recording medium;

an astigmatism element into which the laser light reflected on the recording medium is entered, and which converges the laser light in a first direction for generating a first focal line and converges the laser light in a second direction perpendicular to the first direction for generating a second focal line;

a photodetector which receives the laser light passing through the astigmatism element; and a light separating element into which the laser light reflected on the recording medium is entered, and which guides the laser light entered into two first areas and into two second areas at four respective positions different from each other, on a light receiving surface of the photodetector, and which guides the laser light entered into a third area to a position different from the four positions, on the light receiving surface of the photodetector, the optical pickup device being configured in such a manner that the photodetector has a plurality of sensing portions disposed at the four positions to which the laser light entered into the two first areas and into the two second areas is guided, and has a four-divided sensor disposed at the position to which the laser light entered into the third area is guided, when an intersection of two straight lines extending in parallel to the first direction and the second direction and intersecting with each other is aligned with an optical axis of the laser light, the two first areas are disposed in a direction along which one pair of vertically opposite angles defined by the two straight lines are aligned, and the two second areas are disposed in a direction along which another pair of vertically opposite angles are aligned, the third area is disposed at the intersection of the two straight lines, and the four-divided sensor is disposed at such a position that one of two parting lines of the four-divided sensor is oriented in a direction toward a reference point at which the optical axis of the laser light reflected on the recording medium intersects the light receiving surface of the photodetector, assuming that:

the four-divided sensor is composed of four sensing portions $Bz1$, $Bz2$, $Bz3$ and $Bz4$, the four sensing portion $Bz1$, $Bz2$, $Bz3$ and $Bz4$ are divided into a group constituted of the sensing portions $Bz1$ and $Bz2$, and a group constituted of the sensing portions $Bz3$ and $Bz4$ by the one of the two parting lines of the four-divided sensor oriented in the direction toward the reference point, and the sensing portions $Bz1$, $Bz2$, $Bz3$ and $Bz4$ are divided into a group constituted of the sensing portions $Bz1$ and $Bz4$, and a group constituted of the sensing portions $Bz2$ and $Bz3$ by the other one of the two parting lines of the four-divided sensor, the position adjusting method for the light separating element in the optical pickup device comprising:

a step of adjusting a position of the light separating element in an optical axis direction of the laser light in such a manner that HOEz defined in the following equation is approximated to zero, and a step of adjusting a position of the light separating element in a rotating direction with respect to the reference point as a center in such a manner that HOEθ defined in the following equation is approximated to zero, $$HOEz=\{(Bz1+Bz4)-(Bz2+Bz3)\}/(Bz1+Bz2+Bz3+Bz4)$$

$$HOE\theta=\{(Bz1+Bz2)-(Bz3+Bz4)\}/(Bz1+Bz2+Bz3+Bz4)$$

where
Bz1, Bz2, Bz3 and Bz4 are respectively detection signals to be outputted from the sensing portions Bz1, Bz2, Bz3 and Bz4 when laser light is emitted from the laser light source in a state that the recording medium is loaded in the optical pickup device.

8. A position adjusting method for a light separating element in an optical pickup device, the optical pickup device being provided with:

a laser light source;

an objective lens which focuses laser light emitted from the laser light source on a recording medium;

an astigmatism element into which the laser light reflected on the recording medium is entered, and which converges the laser light in a first direction for generating a first focal line and converges the laser light in a second direction perpendicular to the first direction for generating a second focal line;

a photodetector which receives the laser light passing through the astigmatism element; and a light separating element into which the laser light reflected on the recording medium is entered, and which guides the laser light entered into two first areas and into two second areas at four respective positions different from each other, on a light receiving surface of the photodetector, and which guides the laser light entered into a third area to two positions different from the four positions, on the light receiving surface of the photodetector, the optical pickup device being configured in such a manner that the photodetector has a plurality of sensing portions disposed at the four positions to which the laser light entered into the two first areas and into the two second areas is guided, and has a first four-divided sensor and a second four-divided sensor disposed at the two respective positions to which the laser light entered into the third area is guided, when an intersection of two straight lines extending in parallel to the first direction and the second direction and intersecting with each other is aligned with an optical axis of the laser light, the two first areas are disposed in a direction along which one pair of vertically opposite angles defined by the two straight lines are aligned, and the two second areas are disposed in a direction along which another pair of vertically opposite angles are aligned, the third area is disposed at the intersection of the two straight lines, and the first four-divided sensor and the second four-divided sensor are disposed at such positions that one of two parting lines of the first four-divided sensor, and one of two parting lines of the second four-divided sensor are oriented in a direction toward a reference point at which the optical axis of the laser light reflected on the recording medium intersects the light receiving surface of the photodetector, assuming that:

the first four-divided sensor is composed of four sensing portions C21, C22, C23 and C24, the second four-divided sensor is composed of four sensing portions C31, C32, C33 and C34, the four sensing portion C21, C22, C23 and C24 are divided into a group constituted of the sensing portions C21 and C22, and a group constituted of the sensing portions C23 and C24 by the one of the two parting lines of the first four-divided sensor oriented in the direction toward the reference point, the four sensing portions C21, C22, C23 and C24 are divided into a group constituted of the sensing portions C21 and C24, and a group constituted of the sensing portions C22 and C23 by the other one of the two parting lines of the first four-divided sensor, the four sensing portion C31, C32, C33 and C34 are divided into a group constituted of the sensing portions C31 and C32, and a group constituted of the sensing portions C33 and C34 by the one of the two parting lines of the second four-divided sensor oriented in the direction toward the reference point, and the four sensing portions C31, C32, C33 and C34 are divided into a group constituted of the sensing portions C31 and C34, and a group constituted of the sensing portions C32 and C33 by the other one of the two parting lines of the second four-divided sensor, the position adjusting method for the light separating element in the optical pickup device comprising:

a step of adjusting a position of the light separating element in an optical axis direction of the laser light in such a manner that HOEz defined in the following equation is approximated to zero, and a step of adjusting a position of the light separating element in a rotating direction with respect to the reference point as a center in such a manner that HOEθ defined in the following equation is approximated to zero, $$HOEz = \{\{(C21+C24)-(C22+C23)\}+\{(C32+C33)-(C31+C34)\}\}/\{(C21+C22+C23+C24)+(C31+C32+C33+C34)\}$$

$$HOE\theta = \{\{(C21+C22)-(C23+C24)\}+\{(C33+C34)-(C31+C32)\}\}/\{(C21+C22+C23+C24)+(C31+C32+C33+C34)\}$$

where

C21, C22, C23 and C24 are respectively detection signals to be outputted from the sensing portions C21, C22, C23 and C24 when laser light is emitted from the laser light source in a state that the recording medium is loaded in the optical pickup device, and C31, C32, C33 and C34 are respectively detection signals to be outputted from the sensing portions C31, C32, C33 and C34 when laser light is emitted from the laser light source in a state that the recording medium is loaded in the optical pickup device.

* * * * *